United States Patent
Uprety et al.

(10) Patent No.: US 9,326,327 B2
(45) Date of Patent: Apr. 26, 2016

(54) STACK INCLUDING HEATER LAYER AND DRAIN LAYER

(71) Applicant: PPG Industries Ohio, Inc., Cleveland, OH (US)

(72) Inventors: Krishna K. Uprety, Valencia, CA (US); Alexander Bimanand, Burbank, CA (US); Khushroo H. Lakdawala, Santa Clarita, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 127 days.

(21) Appl. No.: 13/843,421

(22) Filed: Mar. 15, 2013

(65) Prior Publication Data

US 2015/0096969 A1    Apr. 9, 2015

(51) Int. Cl.
*B64D 15/12* (2006.01)
*H05B 3/84* (2006.01)

(52) U.S. Cl.
CPC ............ *H05B 3/84* (2013.01); *B64D 15/12* (2013.01); *H05B 2203/013* (2013.01); *H05B 2214/04* (2013.01)

(58) Field of Classification Search
CPC .................................. H05B 3/84; B64D 15/12
USPC ...................................... 257/211; 428/38, 46
See application file for complete search history.

(56) References Cited

U.S. PATENT DOCUMENTS

| | | |
|---|---|---|
| 3,017,386 A | 1/1962 | Brown, Jr. et al. |
| 3,180,781 A | 4/1965 | Ryan et al. |
| 4,078,107 A | 3/1978 | Bitterice et al. |
| 4,234,664 A | 11/1980 | Hendy |
| 4,465,736 A | 8/1984 | Nishihara et al. |
| 4,590,535 A | 5/1986 | Mang |
| 4,642,263 A | 2/1987 | Culbertson |
| 5,084,132 A | 1/1992 | Smith |
| 5,213,828 A | 5/1993 | Winter et al. |
| 5,378,535 A | 1/1995 | Moncur et al. |
| 5,780,160 A | 7/1998 | Allemand et al. |
| 5,859,722 A | 1/1999 | Suga et al. |
| 5,939,188 A | 8/1999 | Moncur et al. |

(Continued)

FOREIGN PATENT DOCUMENTS

| | | |
|---|---|---|
| EP | 0 314 153 A2 | 5/1989 |
| EP | 0 690 665 A1 | 1/1996 |

(Continued)

OTHER PUBLICATIONS

International Search Report and Written Opinion mailed on May 22, 2014, for International Application No. PCT/US2014/011273, filed Jan. 13, 2014; 10 pages.

(Continued)

*Primary Examiner* — Trang Tran
(74) *Attorney, Agent, or Firm* — Lewis Roca Rothgerber Christie LLP

(57) ABSTRACT

A multi-layer stack includes: a substrate; a drain layer on a first side of the substrate, the drain layer having a sheet resistance of less than about $10^6$ ohms per square; a heater layer on the drain layer; and a dielectric layer between the heater layer and the drain layer is disclosed. A transparency for a flying vehicle including the multi-layer stack and having the drain layer configured to be grounded to the flying vehicle, and a flying vehicle including the transparency is also disclosed.

20 Claims, 6 Drawing Sheets

(56) References Cited

U.S. PATENT DOCUMENTS

| | | |
|---|---|---|
| 6,213,602 B1 | 4/2001 | Smarto |
| 6,417,292 B1 | 7/2002 | Moriarity et al. |
| 6,426,125 B1 | 7/2002 | Yang et al. |
| 6,690,564 B1 | 2/2004 | Haruta et al. |
| 6,737,121 B2 | 5/2004 | Yang et al. |
| 7,093,307 B1 | 8/2006 | Smith |
| 7,626,749 B2 | 12/2009 | Baur et al. |
| 7,636,188 B2 | 12/2009 | Baur et al. |
| 7,859,738 B2 | 12/2010 | Baur et al. |
| 7,977,255 B1 * | 7/2011 | Scheer ............. H01L 21/0214 118/723 I |
| 8,022,913 B2 * | 9/2011 | Zhang ............. G02F 1/133382 345/101 |
| 2002/0110695 A1 | 8/2002 | Yang et al. |
| 2003/0054172 A1 | 3/2003 | Savu et al. |
| 2006/0134501 A1 | 6/2006 | Lee et al. |
| 2007/0002421 A1 | 1/2007 | Rukavina et al. |
| 2007/0029299 A1 | 2/2007 | Prone et al. |
| 2007/0224340 A1 | 9/2007 | Hatta et al. |
| 2007/0249088 A1 | 10/2007 | Ohmori et al. |
| 2008/0073622 A1 | 3/2008 | Housel |
| 2008/0176973 A1 | 7/2008 | Qiu et al. |
| 2008/0212189 A1 | 9/2008 | Baur et al. |
| 2009/0040306 A1 | 2/2009 | Foote et al. |
| 2009/0074973 A1 | 3/2009 | Graham et al. |
| 2009/0080055 A1 | 3/2009 | Baur et al. |
| 2009/0289235 A1 | 11/2009 | Kniajanski et al. |
| 2009/0301461 A1 | 12/2009 | Taplan et al. |
| 2010/0025533 A1 | 2/2010 | Bimanand et al. |
| 2010/0028684 A1 | 2/2010 | Mariscal et al. |
| 2010/0066519 A1 | 3/2010 | Baur et al. |
| 2010/0156842 A1 | 6/2010 | Cherif |
| 2013/0087655 A1 | 4/2013 | Eddy |

FOREIGN PATENT DOCUMENTS

| | | |
|---|---|---|
| EP | 2128528 A2 | 12/2009 |
| GB | 879380 | 10/1961 |
| WO | WO 00/55389 | 9/2000 |
| WO | WO 2006/124682 A2 | 11/2006 |
| WO | WO 2007/040352 A1 | 4/2007 |
| WO | WO 2013/130137 A1 | 9/2013 |

OTHER PUBLICATIONS

International Search Report and Written Opinion dated Sep. 15, 2009 for PCT application No. PCT/US 2009/52009, 11 pages.

International Search Report and Written Opinion dated Sep. 23, 2009 for PCT application No. PCT/US 2009/052015, 11 pages.

Berredjem, Y., et al., "On the improvement of the efficiency of organic photovoltaic cells by the presence of an ultra-thin metal layer at the interface organic/ITO," The European Physical Journal Applied Physics, Oct. 24, 2008, vol. 44, p. 223-228.

Cairns, Darran R., et al., "Strain-dependent electrical resistance of tin-doped indium oxide on polymer substrates," Applied Physics Letters, Mar. 13, 2000, vol. 76, No. 11, p. 1425-1427.

Fortunato, Elvira et al., "Influence of the Strain on the Electrical Resistance of Zinc Oxide Doped Thin Film Deposited on Plymer Substrates," Advanced Engineering Materials, May 1, 2002, vol. 4, No. 8, p. 610-612.

Lansaker, P.C., et al., "$TiO_2$/Au/$TiO_2$ multilayer thin films: Novel metal-based transparent conductors for electrochromic devices," Thin Solid Films, 2009, vol. 518, p. 1225-1229.

Sharp, P. J., "Static Electrification of Electrically Heated Aircraft Windscreens: An investigation into the causes of electrical failures experienced by different aircraft and possible solution!", Aircraft Engineering and Aerospace Technology, vol. 41(7), Jul. 1969, p. 24-31.

Thornell, J., "Precipitation-Static (P-Static) Overview of Composite Aircraft," SAE Technical Paper 2001-01-2933, 2001.

* cited by examiner

STACK INCLUDING HEATER LAYER AND DRAIN LAYER

BACKGROUND

Precipitation static ("P-static") may form on airborne vehicles (e.g., aircraft) as a result of the vehicle being in certain types of weather (e.g., thunderstorms) and/or from airborne particles, such as ice, snow, rain droplets and dust, striking the vehicle and inducing a charge through triboelectric charging (e.g., frictional charging). P-static may interfere with the vehicle's electronic systems. For example, electric discharge from P-static may interfere with the vehicle's radio systems.

P-static can also cause a heater layer (e.g., a heater film) on a transparency (e.g., canopy, windshield or window) of the vehicle to fail. The heater layer may be used for deicing and/or defogging the transparency (e.g., the windshield) and, thus, a failure of the heater layer impacts the operability of the vehicle. Additionally, excessive charge built up on a windshield of an aircraft can produce arcing, which may cause a substrate (e.g., glass or plastic) of the windshield to break.

SUMMARY

Aspects of embodiments of the disclosed subject matter are directed to a multi-layer stack including a drain layer to reduce an amount or likelihood of damage to a heater layer or a substrate of the multi-layer stack as a result of induced electric charge at the heater layer.

According to embodiments of the disclosed subject matter, a multi-layer stack includes: a substrate; a drain layer on a first side of the substrate, the drain layer having a sheet resistance of less than about $10^6$ ohms per square; a heater layer on the drain layer; and a dielectric layer between the heater layer and the drain layer.

The dielectric layer can be configured to electrically insulate the heater layer from the drain layer such that the heater layer is capable of converting electric current applied to the heater layer to heat for (or capable of) melting ice or dissipating condensed moisture formed on the multi-layer stack. For example, the dielectric layer can have a dielectric constant of at least about 2, for example in a range of 2 to 10, or at least about.

In some embodiments, the drain layer has a sheet resistance of less than about $10^4$ ohms per square, or less than about 2,000 ohms per square. For example, the drain layer can have a sheet resistance of less than about 500 ohms per square.

In some embodiments, the substrate includes a glass, a polyacrylate (e.g., a stretched polyacrylate or a casted polyacrylate), a polycarbonate, a polyurethane or a combination thereof.

The drain layer can include a conductive oxide layer, a transparent conductive metal layer, a conductive mesh or a combination thereof. For example, the transparent oxide layer can include indium tin oxide, aluminum-doped zinc oxide, tin oxide, antimony-doped tin oxide, or combination thereof. In some embodiments, a metal of the transparent conductive metal layer is gold, silver, palladium, platinum, or a combination thereof. The conductive mesh can include inkjet printed electrically conductive lines, lithographically patterned electrically conductive lines, woven wire mesh, or a combination thereof.

In some embodiments, the dielectric layer includes an organic layer, an inorganic layer, or a combination thereof. For example, the organic layer can include a polysiloxane, a polyacrylate, a polyurethane, an epoxy, or a combination thereof. In some embodiments, the inorganic layer includes a diamond like carbon, a silicon oxide, a titanium oxide, an aluminum oxide, a silicon oxycarbide, an aluminum oxynitride, or a combination thereof.

In some embodiments, the heater layer has a sheet resistance in a range of 0.02 to 1,000 ohms per square.

In some embodiments, the multi-layer stack also includes a first topcoat on a second side of the substrate opposite to the first side. The first topcoat can be any suitable protective coating. For example, the first topcoat can include a diamond like carbon, a polyurethane, a polyacrylate, a polysiloxane, an epoxy, a silicon oxide, a titanium oxide, an aluminum oxide, a silicon oxycarbide, zirconium oxynitride, cerium oxide, or a combination thereof.

In some embodiments, the multi-layer stack also includes a base layer between the substrate and the drain layer. The base layer can include a polysiloxane, a polyacrylate, an epoxy, a polyurethane, or a combination thereof.

In some embodiments, the multi-layer stack also includes a second topcoat on the heater layer. The second topcoat can be any suitable protective coating. For example, the second topcoat can include a diamond like carbon, a polyurethane, a polyacrylate, a polysiloxane, an epoxy, a silicon oxide, a titanium oxide, an aluminum oxide, a silicon oxycarbide, zirconium oxynitride, cerium oxide, or a combination thereof.

According to another embodiment, a transparency for a flying vehicle includes a multi-layer stack including: a substrate; a drain layer on a first side of the substrate, the drain layer having a sheet resistance of less than about $10^6$ ohms per square and being configured to be grounded to the flying vehicle; a heater layer on the drain layer; and a dielectric layer between the heater layer and the drain layer.

In some embodiments, the multi-layer stack is configured to have the first side of the substrate face toward an interior of the flying vehicle, and the substrate has a second side opposite to the first side, the second side being configured to face toward an exterior of the flying vehicle.

The dielectric layer can be configured to electrically insulate the heater layer from the drain layer such that the heater layer is capable of converting electric current applied to the heater layer to heat for (or capable of) melting ice or dissipating condensed moisture formed on the transparency.

In some embodiments, the substrate has a second side opposite to the first side, and the drain layer is configured to be grounded to the flying vehicle to dissipate a charge induced at a second side of the substrate and to reduce an amount of charge induced at the heater layer.

According to another embodiment, a flying vehicle includes a transparency including a multi-layer stack including: a substrate; a drain layer on a first side of the substrate, the drain layer having a sheet resistance of less than about $10^6$ ohms per square and being configured to be grounded to the flying vehicle; a heater layer on the drain layer; and a dielectric layer between the heater layer and the drain layer.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
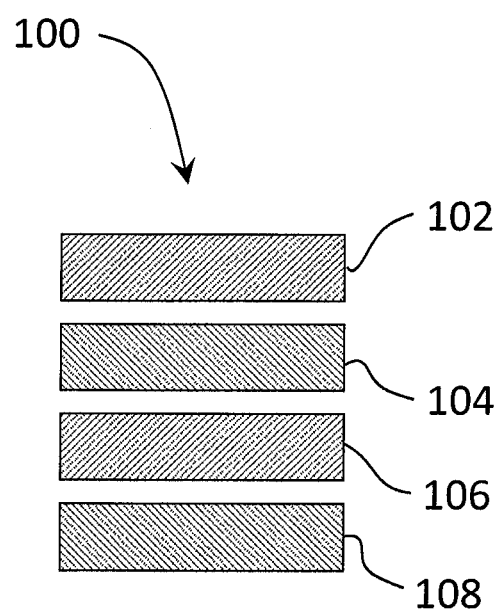
FIG. 1 is an exploded, cross-sectional view of an embodiment of a multi-layer stack.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween, and "on" can mean "below." For example, a layer that is "on" another layer can also be considered "below" the other layer, depending upon the point of view. The substrate and transparency described herein can be made of glass, plastic or other suitable materials, can be coated or uncoated, and can form a canopy, a window or a windshield of a car, aircraft, boat, building, or any other suitable vehicle or structure. In the drawings, some features, such as the thicknesses of layers and regions, may be magnified or exaggerated for clarity. The present disclosure is not limited to the sizes and thicknesses shown in the drawings. Like reference numerals designate like elements throughout the specification.

Aircraft transparencies (e.g., windows, windshields or canopies) can fail when a heater layer of the transparency is damaged. Because the heater layer is used for de-icing and/or defogging of the transparency, damage to the heater layer may affect pilot visibility in inclement weather and may affect the operability of the aircraft. Damage to the heater layer may be related to the static electrification of the transparency as a result of P-static. The transparency may act in a manner similar to that of a two plate capacitor with the heater layer acting as a conductive plate. As a result, a rise in electric potential at an external surface of the transparency may induce a similar (or related) rise in electric potential at the heater layer as a result of capacitive effects. The rise in electric potential at the heater layer may result in damage to the heater layer or a substrate of the transparency, for example, through arcing.

Although the transparency can include an external conductive layer (e.g., an anti-static layer) to dissipate some P-static, the sheet resistance of such a layer is limited by environmental durability considerations for the external layer. For example, external conductive layers do not have both a sheet resistance of less than $10^6$ ohms per square and suitable environmental durability. Additionally, while grounding the heater layer may prevent charge from being induced at the heater layer, grounding the heater layer prevents or inhibits the heater layer from producing heat as electric current applied to the heater layer will be transmitted to the ground.

As shown in FIG. 1, according to an embodiment of the present disclosure, a multi-layer stack 100 includes a substrate 102, a drain layer 104 (or grounding layer) on a first side of the substrate, a heater layer 108 on the drain layer, and a dielectric layer 106 between the heater layer and the drain layer. The multi-layer stack may be included in a transparency, such as a transparency for a flying vehicle (e.g., aircraft). The flying vehicle can be any suitable aircraft, such as a jet aircraft (commercial passenger, cargo, private or military) or a propeller aircraft (commercial passenger, cargo, private or military), such as a tiltrotor aircraft, but the present disclosure is not limited thereto.

The first side of the substrate 102 may be configured to face toward an interior of a flying vehicle (e.g., aircraft). Accordingly, the drain layer 104 may be at an interior side of the substrate. As such, the drain layer may not be subject to the same environmental considerations as an external conductive layer. Accordingly, the drain layer 104 may be more conductive (e.g., have a lower sheet resistance) than an external conductive coating for a transparency. For example, because the drain layer is at the interior side of the substrate, the drain layer is protected from the environment outside of the vehicle and, therefore, may include materials that are less durable than those included in an external conductive layer.

In some embodiments, the drain layer 104 has a sheet resistance of less than about $10^6$ ohms per square (i.e., $\Omega/\square$). For example, the drain layer may have a sheet resistance of less than about 2,000 ohms per square, or less than about 500 ohms per square. For example, the drain layer may have a sheet resistance in a range of 0.1 to 50 ohms per square. In some embodiments, the drain layer has a sheet resistance in a range of 10 to 2,000 ohms per square. In other embodiments, the drain layer has a sheet resistance in a range of 50-500 ohms per square.

By having a sheet resistance of less than about $10^6$ ohms per square, the drain layer 104 can drain additional P-static not dissipated by an external conductive layer. By further draining additional P-static, the drain layer reduces the amount of electric charge induced at the heater layer 108, or even prevents induction of electric charge at the heater layer, as a result of P-static buildup at the transparency (e.g., at a second side or exterior side of the substrate 102 opposite to the first side of the substrate facing the drain layer), thereby extending the life expectancy of the transparency. Accordingly, aspects of embodiments of the present disclosure are directed to a multi-layer stack including a drain layer to reduce an amount (or likelihood) of damage to a heater layer or a substrate of a transparency as a result of induced electric charge at the heater layer.

The drain layer 104 can include any suitable material, such as a material that provides a drain layer having a sheet resistance of less than about $10^6$ ohms per square. For example, the drain layer can include a transparent conductive oxide layer, a transparent conductive metal layer, a conductive mesh or a combination thereof. For example, the transparent conductive oxide layer can include indium tin oxide (ITO), aluminum-doped zinc oxide (AZO), tin oxide, antimony-doped tin oxide or a combination thereof. A metal of the transparent conductive metal layer can be gold, silver, palladium, platinum, or a combination thereof. The conductive mesh can include inkjet printed electrically conductive lines, lithographically patterned electrically conductive lines, woven wire mesh, or a combination thereof.

For example, ITO can be prepared using a DC magnetron sputtering system. First, a chamber for preparing a drain layer including ITO can be pumped down to a vacuum level in a range of $10^{-5}$ to $10^{-6}$ torr, or less. The substrate to which the ITO is to be applied can be heated to a temperature in a range of 100 to 200° F., and argon and oxygen can be flowed into the chamber during the ITO deposition. For example, argon can be flowed at a flow rate in a range of 300 to 900 sccm and oxygen can be flowed at a flow rate in a range of 10 to 400 sccm. The ITO can be deposited by applying a power density in a range of 0.5 to 5 kw to the target. The resultant drain layer can have a thickness in a range of 15 to 500 nm. The drain layer including ITO can have a sheet resistance in a range of 10 to 2,000 ohms per square, and a light transmission in a range of 80 to 88%.

A drain layer including a conductive metal (e.g., gold) can be prepared by sputtering or evaporation in a coating chamber. The chamber can be first pumped down to a vacuum level in a range of $10^{-5}$ to $10^{-6}$ torr, or less. Evaporation can be performed at room temperature for a time period in a range of 5 to 20 seconds. A drain layer including gold prepared by evaporation can have a sheet resistance in a range of 50 to 500 ohms per square, and a light transmission in a range of 70 to 80%.

Gold can also be sputtered using a DC magnetron sputtering system. The gold can be sputtered in a chamber that is first pumped down to a vacuum level in a range of $10^{-5}$ to $10^{-6}$ torr, or less. The substrate to which the gold is to be applied can be heated to a temperature in a range of 100 to 200° F. and argon can be flowed into the chamber during sputtering. For example, argon can be flowed at a flow rate in a range of 300 to 900 sccm during the deposition of gold. The gold may be sputtered by applying a power density in a range of 0.5 to 2 kW to the target. A drain layer including gold prepared by sputtering can have a sheet resistance in a range of 50 to 500 ohms per square, and a light transmission in a range of 70 to 80%.

The drain layer 104 can include a conductive mesh as described in U.S. patent application Ser. No. 13/411,476, the entire contents of which are incorporated herein by reference. The conductive mesh can include a plurality of electrically conductive lines (e.g., inkjet printed electrically conductive lines, lithographically patterned electrically conductive lines, woven wire mesh or a combination thereof). At least one electrically conductive line intersects at least one other electrically conductive line. The conductive mesh can be on a polymer film, and the electrically conductive lines can physically contact the polymer film. Alternatively, the electrically conductive lines may be inkjet printed or lithographically patterned directly on the substrate 102 (e.g., the electrically conductive lines can physically contact the substrate). The present disclosure, however, is not limited to having a single conductive mesh. For example, the conductive mesh may be repeated to form a stacked structure on the substrate 102.

According to certain embodiments of the present invention, the electrically conductive lines are spaced apart from one another. For example, the electrically conductive lines can be spaced apart by any distance suitable for the drain layer 104 prevent or reduce the induction of an electric charge at the heater layer 108.

The arrangement of the electrically conductive lines in the mesh is not limiting. That is, the mesh (i.e., the electrically conductive lines) can be arranged in any form of pattern or tessellation. For example, the mesh can be arranged as a square grid, triangular tiling, hexagonal tiling, or grid formed from straight, undulating, sinusoidal or zigzag lines. The mesh can be arranged in any form of uniform, non-uniform, repeating or random pattern. Each of the electrically conductive lines can have a width about 25 μm, but they are not limited thereto. Additionally, each square between the electrically conductive lines can have a width of about 250 μm, but they are not limited thereto.

Examples of conductive meshes can be obtained from CIMA Nanotech, Inc., Dontech, Inc., Applied Nanotech Holdings, Inc., NanoMas Technologies, Inc., and FUJIFILM Dimatix, Inc. In other embodiments, the conductive mesh is formed by a plurality of inkjet printed electrically conductive lines or a plurality of lithographically patterned electrically conductive lines on (e.g., physically contacting) the substrate 102, wherein at least one electrically conductive line intersects at least one other electrically conductive line.

The electrically conductive lines can be inkjet printed or lithographically on any suitable polymer film, such as, for example, polyethylene terephthalate, polycarbonate, or polyurethane. According to other embodiments of the present invention, the conductive mesh is formed by a plurality of electrically conductive lines inkjet printed or lithographically patterned on glass, polyacrylate, polycarbonate, or any other suitable substrate. In any of the embodiments of the invention, the plurality of electrically conductive lines can be prepared by inkjet printing conductive inks, such as the METALON® conductive inks available from Novacentrix. In certain embodiments, the plurality of electrically conductive lines include any suitable inkjet printed metal, such as copper (Cu), gold (Au), nickel (Ni), silver (Ag), or a combination thereof. For example, the plurality of electrically conductive lines can include Cu. The plurality of electrically conductive lines can further include epoxy, or any other material having suitable binding properties.

In certain embodiments, the conductive mesh has a sheet resistance in a range of about 0.02 to about 1,000 ohms per square. In other embodiments, the conductive mesh has a sheet resistance of less than 400 ohms per square. In still other embodiments, the conductive mesh has a sheet resistance of less than 100 ohms per square.

The conductive mesh can be on a polymer film. The polymer film may include any suitable polymer, such as polyethylene terephthalate, polycarbonate, or polyurethane, but the present disclosure is not limited thereto. In certain embodiments, the plurality of electrically conductive lines physically contact the polymer film. For example, the plurality of electrically conductive lines can be inkjet printed or lithographically patterned on the polymer film (e.g., deposited on the polymer film by inkjet printing or lithographic patterning). The polymer film can have a thickness in a range of about 70 μm to about 1,000 μm. The plurality of electrically conductive lines may each have a width in a range of about 20 μm to about 50 μm. The plurality of electrically conductive lines may each have a thickness in a range of about 50 nm to about 5 μm. The thickness and/or width of the electrically conductive lines may be varied to vary the electric charge draining properties of the drain layer 104.

The electrically conductive lines may be formed by inkjet printing any suitable ink onto the substrate. For example, electrically conductive lines can be prepared by inkjet printing conductive inks, such as the METALON® conductive inks available from Novacentrix onto the substrate 102. The inkjet printing may be performed according to any suitable inkjet printing technique, such as those described in Huang, Lu, et al., *Graphene-based conducting inks for direct inkjet printing of flexible conductive patterns and their applications in electric circuits and chemical sensors*, Nano Research (2011), vol. 4, issue 7, 675-684, the entire contents of which are herein incorporated by reference.

In another embodiment, a method of preparing a transparency includes laminating a polymer film and a substrate together, wherein a conductive mesh is formed by a plurality of electrically conductive lines on the polymer film. For example, the polymer film, a second bonding film, and the substrate 102 can be laminated together in a lamination process to form a laminated substrate. The lamination process can include heating the polymer film, the second bonding film, and the substrate at a temperature in a range of about 200 to about 300° F. Further, the lamination process may include pressing the polymer film, the second bonding film, and the substrate at a pressure in a range of about 50 to about 250 psi. Laminating the polymer film, the second bonding film, and the substrate together may be carried out for a time period in a range of about 15 minutes to about 5 hours. The lamination process can be carried out in an airtight vacuum plastic bag that has been evacuated. Additionally or alternatively, the lamination process can be carried out in an autoclave.

The substrate 102 can be any suitable substrate, such as a transparent substrate. Examples of the substrate include glasses (e.g., transparent glass), polyacrylates (e.g, casted or stretched acrylics), polycarbonates, polyurethanes and similar materials formed from an organic resin. In some embodiments, the polyurethane of the substrate is OPTICOR, which may be obtained from PPG Industries Inc. OPTICOR is a trademark of PPG Industries Inc. For example, the polyurethane of the substrate may be any polyurethane set forth in U.S. Patent Application Publication No. 2009/0280329 A1, the entire contents of which are herein incorporated by reference.

The dielectric layer 106 can be between the drain layer 104 and the heater layer 108. Thus, if the dielectric layer is not sufficiently electrically insulating, then current leakage from the heater layer to the drain layer may be an issue. For example, if the dielectric layer is not sufficiently electrically insulating, then electric current may leak from the heater layer through the dielectric layer to the drain layer. If the electric current leaks from the heater layer to the drain layer, the electric charge will pass through to the ground, and the heater layer will not convert the electric energy to heat sufficient to de-ice or defog the transparency. As used herein, the term "dielectric layer" refers to a layer capable of electrically insulating the drain layer and heater layer from one another such that the heater layer can convert electric current applied to the heater layer to heat sufficient to remove condensed moisture (e.g., ice and/or "fog") from the transparency (e.g., to de-ice or defog the transparency). For example, the dielectric layer can be configured to electrically insulate the heater layer from the drain layer such that the heater layer is capable of converting electric current applied to the heater layer to heat for melting ice or dissipating condensed moisture formed on the multi-layer stack. In some embodiments, the dielectric layer has a dielectric constant of at least about 2 (e.g., in a range of 2 to 10). For example, the dielectric layer can include silicon oxide having a dielectric constant in a range of about 3.7 to about 3.9, $Al_2O_3$ having a dielectric constant in a range of about 9 to about 10 (e.g., about 9.7), silicon oxycarbide having a dielectric constant in a range of about 3.1 to about 3.8, a polyacrylate (e.g., acrylic) having a dielectric constant in a range of about 2.1 to about 3.9, a polysiloxane having a dielectric constant in a range of about 2 to about 6, a diamond like carbon having a dielectric constant in a range of about 3.5 to about 5, or a glass having a dielectric constant in a range of about 3.5 to about 3.9.

The dielectric layer 106 can include an organic layer, an inorganic layer, or a combination thereof. For example, the organic layer can include a polysiloxane, a polyacrylate, a polyurethane, an epoxy, or a combination thereof. The inorganic layer can include a diamond like carbon, a silicon oxide, a titanium oxide, an aluminum oxide, a zirconium oxynitride, any suitable material deposited by plasma enhanced chemical vapor deposition (PECVD), such as a silicon oxycarbide, or a combination thereof. The inorganic layer can be prepared using vacuum coating techniques, such as radio frequency magnetron sputtering, radio frequency superimposed pulse DC power supply, plasma enhanced chemical vapor deposition, and/or atomic layer deposition.

In some embodiments, the dielectric layer 106 includes a polyacrylate. A polyacrylate can be include a mixture of monomeric, oligomeric and polymeric acrylic compounds. The monomeric acrylic can be monofunctional, difunctional, trifunctional, tetrafunctional, pentafunctional or hexafunctional, but the present disclosure is not limited thereto. When the functionality is more than 1, the monomer participates in cross linking which enhances chemical, solvent and abrasion resistance of the dielectric layer. In some embodiments the polyacrylates are prepared from monomers that are difunctional. The backbone of the polyacrylates can be based on polyurethane epoxy acrylate and polycarbonate chemistry. The polyacrylates provide good resiliency, flexibility and film forming properties. A dielectric layer including polyacrylates can be cured using UV and/or thermal energy.

For example, a dielectric layer 106 having a dielectric constant can be prepared by flow coating a polyacrylate coating composition on the drain layer 104 in a humidity and temperature-controlled claim room. The coating composition can then be air dried for 1 to 2 hours. The air dried coating composition can be heat or UV cured. For example, heat curing can be carried out at a temperature in a range of 100 to 200° F. for a time period of 1 to 4 hours. The UV curing can be carried out at a total energy of 6 Joules using multiple passes. The thickness of a dielectric layer including polyacrylate can be in a range of 1 to 20 μm.

The heater layer 108 can have a sheet resistance in a range of 0.02 to 1,000 ohms per square, such as a sheet resistance in a range of 5 to 20 ohms per square or 7 to 20 ohms per square. The heater layer can include a layer that is the same or substantially the same as the drain layer 104 described above. For example, the heater layer can include a transparent conductive oxide layer, a transparent conductive metal layer, a conductive mesh or a combination thereof. For example, the transparent conductive oxide layer can include indium tin oxide (ITO), aluminum-doped zinc oxide (AZO), tin oxide, antimony-doped tin oxide or a combination thereof. A metal of the transparent conductive metal layer can be gold, silver, palladium, platinum, or a combination thereof. The conductive mesh can include inkjet printed electrically conductive lines, lithographically patterned electrically conductive lines, or a combination thereof. The conductive mesh is the same or substantially the same as that described above and, therefore, further description thereof is omitted here.

ITO can be prepared using a DC magnetron sputtering system. First, a chamber for preparing a drain layer including ITO can be pumped down to a vacuum level in a range of $10^{-5}$ to $10^{-6}$ torr, or less. The substrate to which the ITO is to be applied can be heated to a temperature in a range of 100 to 200° F., and argon and oxygen can be flowed into the chamber during the ITO deposition. For example, argon can be flowed at a flow rate in a range of 300 to 900 sccm and oxygen can be flowed at a flow rate in a range of 10 to 400 sccm. The ITO can be deposited by applying a power density in a range of 0.5 to 5 kw to the target. The resultant heater layer can have a thickness in a range of 200 to 2,000 nm. The heater layer including ITO can have a sheet resistance in a range of 5 to 20 ohms per square, and a light transmission in a range of 70 to 85%.

A heater layer 108 including a conductive metal (e.g., gold) can be prepared by sputtering or evaporation in a coating chamber. The chamber can be first pumped down to a vacuum level in a range of $10^{-5}$ to $10^{-6}$ torr, or less. Evaporation can be performed at room temperature for a time period in a range of 10 to 30 seconds. A heater layer including gold prepared by evaporation can have a sheet resistance in a range of 7 to 20 ohms per square, and a light transmission in a range of 50 to 70%.

Gold can also be sputtered using a DC magnetron sputtering system. The gold can be sputtered in a chamber that is first pumped down to a vacuum level in a range of $10^{-5}$ to $10^{-6}$ torr, or less. The substrate to which the gold is to be applied can be heated to a temperature in a range of 100 to 200° F. and argon can be flowed into the chamber during sputtering. For example, argon can be flowed at a flow rate in a range of 300 to 900 sccm during the deposition of gold. The gold may be sputtered by applying a power density in a range of 0.5 to 2 kW to the target. The thickness of the layer including the gold can be in a range of 6 to 15 nm. A drain layer including gold prepared by sputtering can have a sheet resistance in a range of 5 to 20 ohms per square, and a light transmission in a range of 50 to 65%.

Figure 2:
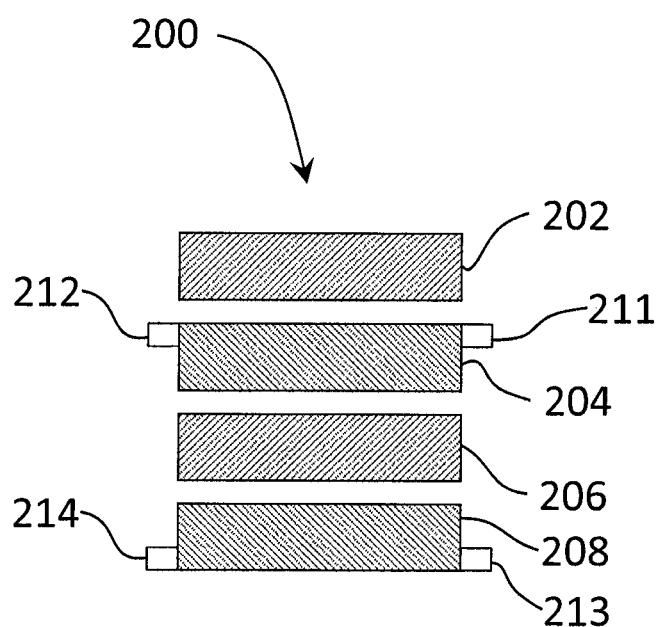
FIG. 2 is an exploded, cross-sectional view of another embodiment of a multi-layer stack.

Additional features and layers (e.g., films) of the multi-layer stack and transparency according to embodiments of the present disclosure will now be described. Depending upon the particular embodiment, these additional features and/or layers may or may not be present in the multi-layer stack and/or transparency. For example, a multi-layer stack 200 according to an embodiment of the present invention is shown in FIG. 2. The multi-layer stack includes a substrate 202, a drain layer 204, a dielectric layer 206, and a heater layer 208, each of which is the same or substantially the same as the corresponding layers described above and, therefore, further description thereof will be omitted here. The multi-layer stack further includes leads or tabs 211 and 212 for grounding the drain layer. For example, the leads or tabs may be configured to ground the drain layer to a flying vehicle (e.g., an aircraft), for example when the multi-layer stack is included in a transparency for a flying vehicle. The multi-layer stack can also include leads or tabs 213 and 214 for supplying electric current to the heater layer 208.

Figure 3:
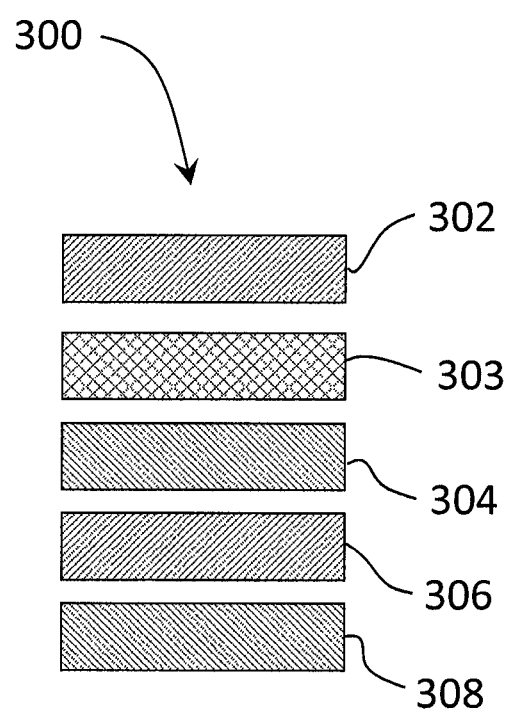
FIG. 3 is an exploded, cross-sectional view of another embodiment of a multi-layer stack.

FIG. 3 shows another embodiment of a multi-layer stack 300. The multi-layer stack includes a substrate 302, a drain layer 304, a dielectric layer 306, and a heater layer 308, each of which is the same or substantially the same as the corresponding layers described above and, therefore, further description thereof will be omitted here. The multi-layer stack further includes a base layer 303 between the substrate and the drain layer. The base layer can provide a surface suitable for depositing the drain layer and can enhance adhesion of the base layer to the substrate. The base layer can be prepared from a silane or a mixture of silanes. In a non-limiting example, the base layer can be prepared by mixing vinyltrimethoxysilane and 3-aminopropyltriethoxysilane together and hydrolyzing in the presence of water to form the corresponding silanol. The silanols can then be reacted at ambient conditions to form a pre-condensate. The pre-condensate can be diluted with a mixture of isopropyl alcohol (IPA) and ethanol to form a solution. The solution can be flow coated onto the substrate by saturation technique, air dried for a time period in a range of 30 to 90 minutes and then cured at a temperature in a range of 100 to 200° F. for a time period of 2 to 6 hours to form the base layer.

Figure 4:
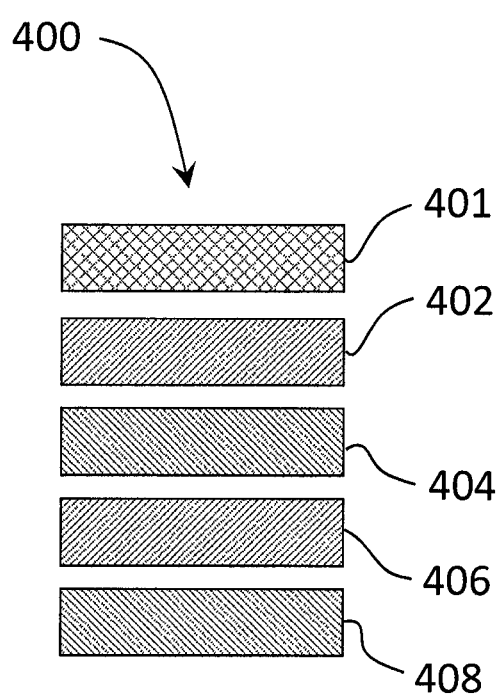
FIG. 4 is an exploded, cross-sectional view of another embodiment of a multi-layer stack.

FIG. 4 shows another embodiment of a multi-layer stack 400. The multi-layer stack includes a substrate 402, a drain layer 404, a dielectric layer 406, and a heater layer 408, each of which is the same or substantially the same as the corresponding layers described above and, therefore, further description thereof will be omitted here. The multi-layer stack further includes a first topcoat 401 on a second side (e.g., an exterior side) of the substrate. The first topcoat can be any suitable protective coating. For example, the first topcoat can include a diamond like carbon, a polyurethane, a polyacrylate, a polysiloxane, an epoxy, a silicon oxide, an aluminum oxide, a material deposited by plasma enhanced chemical vapor deposition (e.g., a silicon oxycarbide), zirconium oxynitride, cerium oxide, or a combination thereof. The first topcoat protects the multi-layer stack from the external environment. The first topcoat may also be conductive and dissipate some amount of P-static.

For example, the first topcoat can be formed from a coating composition including a hydrophobic first aliphatic polyisocyanate, a second aliphatic polyisocyanate including a hydrophilic portion, a polyester polyol, a fluorinated polyol and a hydrophilic polyol. The coating composition can be reacted to form a first topcoat including a polyurethane polymer. Thus, as described herein, the first topcoat can include the various components of the coating composition in their reacted or unreacted forms, for example, the hydrophobic first aliphatic isocyanate and polyester polyol can be included in the first topcoat in their reacted forms (e.g., as monomers in a urethane or carbamate polymer linkage).

A variety of isocyanates and polyisocyanates (such as difunctional, polyfunctional, aromatic, aliphatic, monomeric and oligomeric isocyanates) can be used in coating compositions for forming polyurethane coatings. Aliphatic isocyanates have good hydrolytic stability and UV resistance. Non-limiting examples of monomeric aliphatic diisocyanates include hexamethylene diisocyanate, methylene bis-(4-cyclohexylisocyanate), and isophorone diisocyanate. Monomeric aliphatic diisocyanates can be used to prepare polyisocyanate adducts, prepolymers and thermoplastic polyurethanes ("TPUs"). For example, monomeric aliphatic diisocyanates can be used to prepare biuret-based polyisocyanates (e.g., polyisocyanates including the —(HN—CO—)$_2$N-functional group), isocyanurate ring-based polyisocyanates (e.g., isophorone diisocyanate trimers), and other oligomers of polyisocyanates. More specifically, hexamethylene diisocyanate (HDI) can be used to prepare the HDI-based biuret shown in Structure 1 below or the HDI-based trimer including an isocyanurate ring shown in Structure 2 below. Isophorone diisocyanate (IPDI) can be used to prepare the IPDI-based trimer shown in Structure 3 below, which is an isocyanurate ring-based polyisocyanate. HDI trimers including an isocyanurate ring have much lower viscosity than HDI-based biurets. IPDI trimers have lower reactivity than HDI trimers.

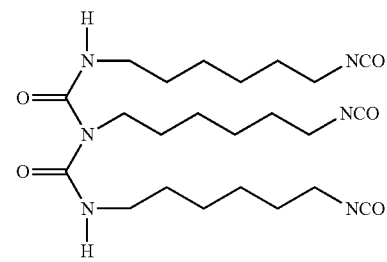
[Structure 1]

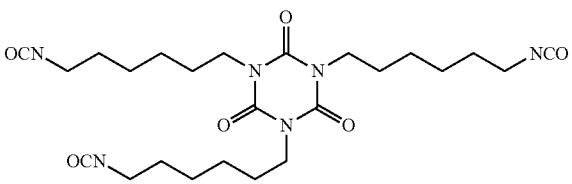
[Structure 2]

-continued

[Structure 3]

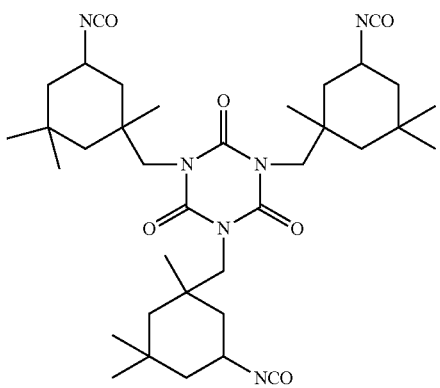

According to embodiments of the present invention, the first aliphatic polyisocyanate can be one or more of a biuret-based polyisocyanate, an isocyanurate ring-based polyisocyanate, or an isophorone diisocyanate oligomer. For example, the first aliphatic polyisocyanate can include one or more of the HDI-based biuret shown in Structure 1 above (or a derivative thereof), the HDI-based trimer including an isocyanurate ring shown in Structure 2 above (or a derivative thereof), or the IPDI-based trimer shown in Structure 3 above (or a derivative thereof). Non-limiting commercially available examples of the first aliphatic polyisocyanate (or mixtures including the first aliphatic polyisocyanate) include methylene bis-(4-cyclohexylisocyanate) (e.g., DESMODUR® W), methylene 1,6-hexamethylene diisocyanate-based polyisocyanates (e.g., DESMODUR® N-75, DESMODUR® N-100, DESMODUR® N-3200, DESMODUR® N-3300, DESMODUR® N-3600, and DESMODUR® N-3790) and isophorone diisocyanate-based polyisocyanates (e.g., DESMODUR® Z-4470) (each available from Bayer Material Science). DESMODUR® is a registered trademark of Bayer Material Science, Leverkusen, Germany. Some of the foregoing examples include an aliphatic polyisocyanate dispersed in (or diluted with) a solvent, which reduces the viscosity of the polyisocyanate, thereby improving ease of handling the first aliphatic polyisocyanate.

The first aliphatic isocyanate can have a functionality of 3 or more (e.g., have 3 or more isocyanate functional groups). In some embodiments, the first aliphatic polyisocyanate has an isocyanate functionality in a range of 3.0 to 4.2. For example, the first aliphatic polyisocyanate can have an isocyanate functionality of about 3.2, 3.5, 3.8 or 4.1. In some embodiments, for example, the first aliphatic polyisocyanate can have an isocyanate functionality of about 3.8

According to embodiments of the present invention, a coating composition including the first aliphatic polyisocyanate described herein (e.g., an HDI biuret-based polyisocyanate) is capable of forming an elastic first topcoat (or film) having good low temperature flexibility, thereby providing resistance to rain erosion that is not achieved with other polyisocyanates. The first topcoat may also have good weatherability and mechanical strength. Some examples of the first topcoat composition including an HDI biuret-based polyisocyanate formed a first topcoat having good durability, but reduced resistance to rain erosion. Some examples of the coating composition including an isocyanurate ring-based polyisocyanate (e.g., an HDI trimer-based polyisocyanate) formed a first topcoat having good resistance to rain erosion, but reduced chemical (e.g., solvent) resistance. Some examples of the coating composition including an isocyanurate ring-based polyisocyanate formed a first topcoat having a relatively short tack-free time and good chemical resistance, but, due to the high $T_g$ of the isocyanurate ring-based polyisocyanate (~60° C.), the resultant first topcoat was rigid and had poor resistance to rain erosion. In comparison, the $T_g$ of some HDI biuret-based polyisocyanates (e.g., DESMODUR® N-75 and DESMODUR® N-100) is about −60° C.

According to embodiments of the invention, the coating composition further includes a second aliphatic polyisocyanate including a hydrophilic portion. The hydrophilic portion of the second aliphatic polyisocyanate can include a polyether chain. In some embodiments, the second aliphatic polyisocyanate further includes a hydrophobic portion. The hydrophobic portion of the second aliphatic isocyanate can include an isophorone diisocyanate moiety or a derivative thereof. Non-limiting, commercially available examples of the second aliphatic polyisocyanate (or mixtures including the second aliphatic polyisocyanate) include polyether modified HDI trimer-based polyisocyanates (e.g., BAYHYDUR® 302 and BAYHYDUR® 303), polyether modified HDI allophonate-based polyisocyanates (e.g., BAYHYDUR® 304, and/or BAYHYDUR® 305), isophorone diisocyanate-based hydrophilically modified aliphatic polyisocyanate (e.g., polyether modified isophorone diisocyanate trimer, such as BAYHYDUR® 2150BA and/or BAYHYDUR® 401-70), ionic aminosulfonic acid modified HDI polyisocyanates (e.g., BAYHYDUR® XP2547, BAYHYDUR® XP2487/1, and/or BAYHYDUR® XP 2655) (each available from Bayer Material Science). BAYHYDUR® is a registered trademark of Bayer Material Science. The second aliphatic polyisocyanate can have a functionality of 2 or more (e.g., 2 or more isocyanate functional groups).

An example of a polyether modified HDI trimer-based polyisocyanate (non-ionic) is shown as Structure 4 below, which is hydrophilic and readily dispersible in water. Examples of the coating composition including a polyether modified HDI trimer-based polyisocyanate (non-ionic) as the second aliphatic polyisocyanate formed first topcoats having enhanced anti-static properties, but the first topcoats exhibited reduced integrity against certain tests such as humidity tests (e.g., exposure to 100% condensing humidity at 122° F. (50° C.)) and 50/50—water/IPA tests (e.g., exposure to a mixture of 50% isopropanol and 50% water). Accordingly, while these polyisocyanates may be used as the second aliphatic polyisocyanate, other polyisocyanates may provide better coating integrity.

[Structure 4]

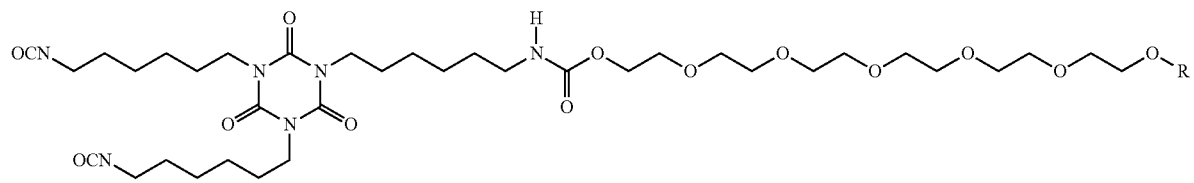

An example of a polyether modified HDI allophonate-based polyisocyanate is shown as Structure 5 below, which is more hydrophobic than the polyether modified HDI trimer-based polyisocyanates (non-ionic) described above, and has higher NCO functionality. Examples of the coating composition including a polyether modified HDI allophonate-based polyisocyanate as the second aliphatic polyisocyanate formed first topcoats having enhanced film durability and resistance, but the first topcoats exhibited reduced static charge dissipation, particularly at −40° F. Accordingly, while these polyisocyanates may be used as the second aliphatic polyisocyanate, other polyisocyanates may provide better charge dissipation.

[Structure 5]

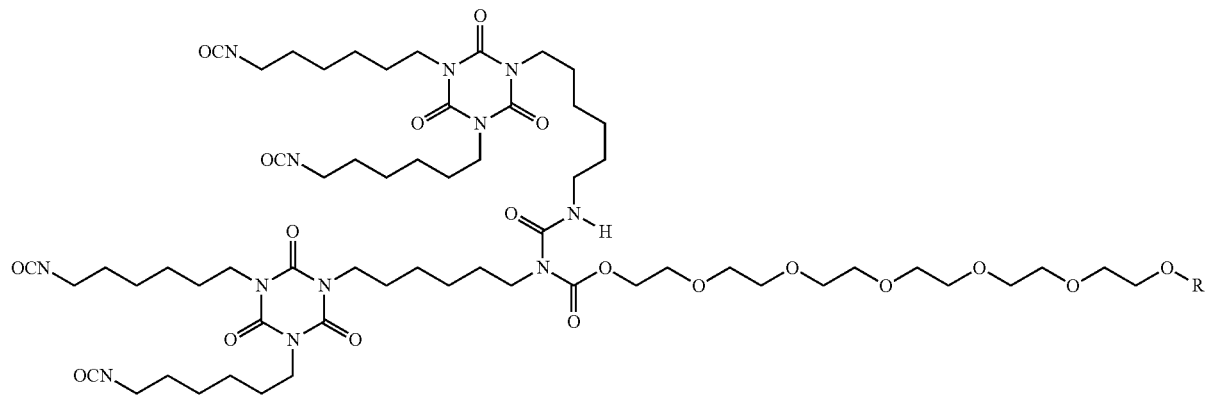

An example of an ionic aminosulfonic acid modified HDI polyisocyanate is shown as Structure 6 below, which has high NCO functionality. Ionic aminosulfonic acid modified HDI polyisocyanates (CAPS) are commercially available from Bayer Material Science as BAYHYDUR® XP2547, BAYHYDUR® XP2487/1, and BAYHYDUR® XP 2655. Examples of the coating composition including an ionic aminosulfonic acid modified HDI polyisocyanate as the second aliphatic polyisocyanate formed first topcoats having good chemical (e.g., solvent) resistance, but the first topcoats exhibited minimal improvement in anti-static properties. Accordingly, while these polyisocyanates may be used as the second aliphatic polyisocyanate, other polyisocyanates may provide better anti-static properties.

[Structure 6]

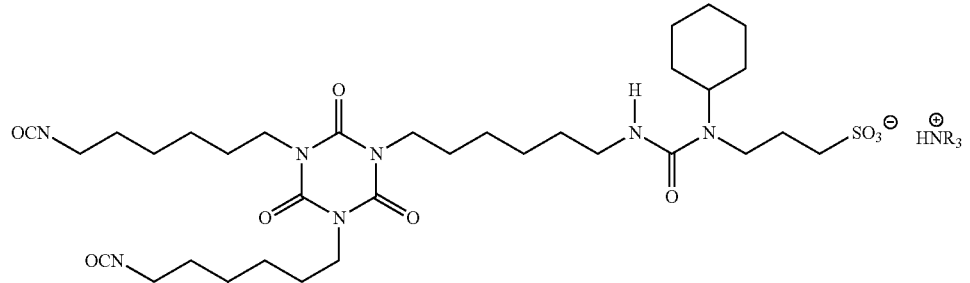

In some embodiments, the second aliphatic polyisocyanate includes a polyether modified IPDI trimer, which includes a polyether chain bonded to an isophorone diisocyanate trimer. An example of a polyether modified IPDI trimer-based polyisocyanate is shown as Structure 7 below. Examples of the coating composition including a polyether modified IPDI trimer-based polyisocyanate as the second aliphatic polyisocyanate unexpectedly formed first topcoats having good film integrity as well as good static charge dissipation properties. A commercial example of a polyether modified IPDI trimer-based polyisocyanate is BAYHYDUR® 401-70, which has a $T_g$ of about 30° C., forms first topcoats having an improved time to tack-free (i.e., a shorter time to become tack-free), reduced surface tackiness, and enhanced anti-static properties. However, when excessive amounts of polyether modified IPDI trimer-based polyisocyanate are included in the coating composition as the second aliphatic isocyanate, the first topcoat formed from the coating composition exhibits reduced resistance to rain erosion, increased sensitivity to humidity, and reduced Bayer abrasion resistance. Accordingly, in some embodiments, a weight ratio of the hydrophobic first aliphatic polyisocyanate to the second aliphatic polyisocyanate is in a range of 95:5 to 85:15, such as, for example, 95:5, 92:8, 90:10, 87:13 or 85:15.

indexes and can be prepared with very high reproducibility. Polycaprolactone polyols and diols can also be prepared with low levels of impurities, are non-toxic and biodegradable, and have high flexibility at low-temperatures, good hydrolytic stability, good tear strength, consistent reactivity and low viscosity (as compared to other polyols). The high flexibility and good tear strength of polycaprolactone polyols and diols can impart resiliency to a first topcoat formed from a coating composition including a polycaprolactone polyol and/or polycaprolactone diol. First topcoats having improved resiliency exhibit enhanced results of the Bayer abrasion test (e.g., testing according to ASTM F735 for 300 cycles and 600 cycles) and rain erosion resistance properties (e.g., enhanced results from a rain erosion test performed using simulated rainfall at various windspeeds, such as 550 mph). Additionally, the low viscosity of polycaprolactone polyols and diols is beneficial for coating compositions having a high solids content. In some embodiments, the polyester polyol includes a polycaprolactone polyol, a polycaprolactone diol or a mixture thereof.

In some embodiments, the polyester polyol is a polycaprolactone polyol including four hydroxyl groups. For example,

[Structure 7]

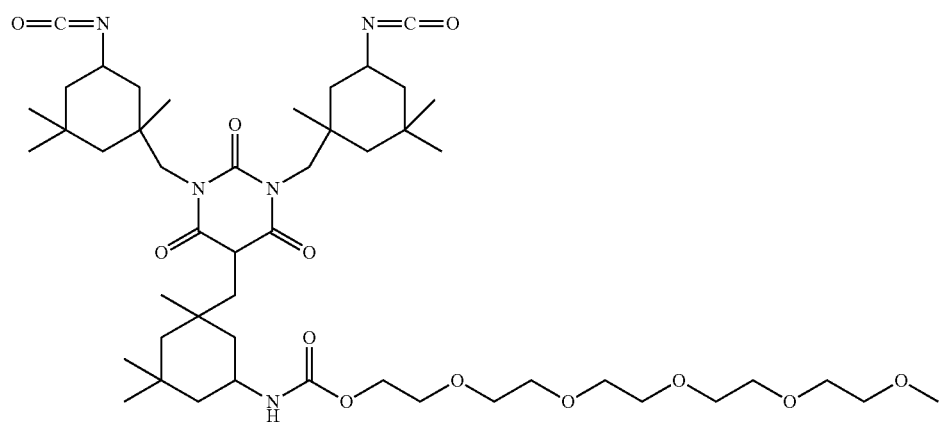

In some embodiments, the coating composition further includes a polyester polyol. For example, the polyester polyol can be an aliphatic compound having 2 to 4 hydroxyl groups or a mixture of aliphatic compounds having an average of 2 to 4 hydroxyl groups. The polyester polyol can provide crosslinking and resiliency to a first topcoat formed from the coating composition. Non-limiting examples of the polyester polyol include polycaprolactone polyols and diols. For example, the polyester polyol can be a polycaprolactone polyol, polycaprolactone diol, or mixture thereof having a weight average molecular weight in a range of 300 to 5,000 g/mole, for example, 500 to 1,500 g/mol, and in some embodiments, about 1,000 g/mol.

Polycaprolactone polyols and diols can be prepared using ring-opening polymerization under mild conditions resulting in well-controlled polymerization resulting in no or few byproducts (e.g., water). Polycaprolactone polyols and diols prepared using ring-opening polymerization have low acid values, highly defined functionality, low polydispersity the polyester polyol may be a polycaprolactone polyol including four polycaprolactone chains. In some embodiments, each of the polycaprolactone chains includes one of the four hydroxyl groups at a terminal end of the polycaprolactone chain. An example of the polyester polyol (e.g., a polycaprolactone polyol) is shown as Structure 8 below. In the polyester polyol shown as Structure 8, n may be in a range of 1 to 6, such as in a range of 2 to 4. For example, in the polyester polyol shown as Structure 8, n may have an average value of 2. When the polyester polyol is a polycaprolactone polyol including four polycaprolactone chains including one hydroxyl group at a terminal end of each polycaprolactone chain, the coating composition may form a first topcoat having enhanced crosslink density, which in turn improves the resistance of the first topcoat to salt-fog and $SO_2$, chemicals (e.g., solvents), and inorganic acids (e.g., sulfuric acid and nitric acid). Additionally, the resultant first topcoat may still have suitable flexibility due to the presence of the caprolactone units (e.g., 1 to 6 units of caprolactone) in each of the four chains.

[Structure 8]

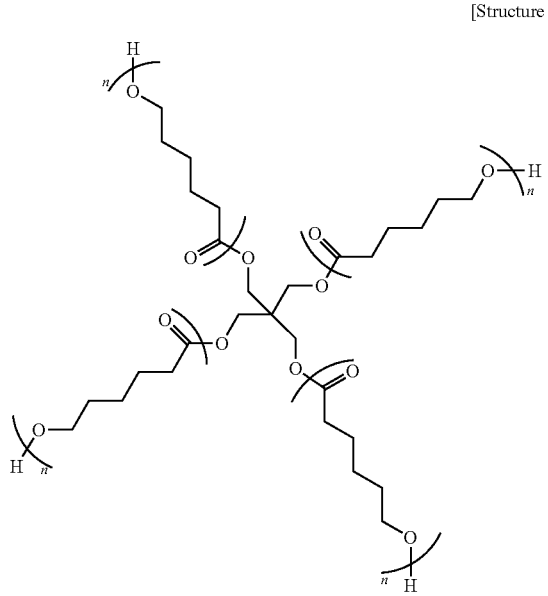

[Structure 9]

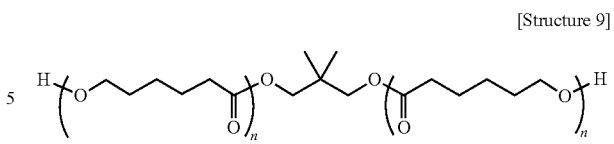

In some embodiments, the polyester polyol is a polyester diol. The polyester diol may be a linear aliphatic diol having a first end including a hydroxyl group and a second end including another primary hydroxyl group. The primary hydroxyl groups may be connected by a polycaprolactone backbone. An example of the polyester polyol (e.g., a polycaprolactone diol) is shown as Structure 9 below. In the polyester diol shown as Structure 9, n may be in a range of 1 to 8, such as in a range of 2 to 6. For example, in the polyester polyol shown as Structure 9, n may have an average value of 4.

When the coating composition includes a polyester polyol, such as a polycaprolactone diol, a first topcoat formed from the coating composition has enhanced resiliency. For example, the relatively long polycaprolactone backbone between the hydroxyl groups may provide the first topcoat with enhanced resiliency. Example embodiments of the first topcoat prepared without the polyester diol, but including another polyester polyol, exhibited resistance to Bayer abrasion (described in more detail above) after 600 strokes of about 3 to 4%, while example embodiments of the first topcoat prepared with the polyester diol exhibited resistance to Bayer abrasion of less than 1% after 600 strokes. Including the polyester diol in the coating composition in excess increases the tackiness of first topcoats formed from the coating composition and reduces the chemical (e.g., solvent) resistance of the first topcoat. Accordingly, in some embodiments, the polyester polyol and the polyester diol are present in the coating composition at a weight ratio of 95:5 to 50:50, for example at a weight ratio 75:25. Non-limiting, commercially available examples of the polyester polyol and the polyester diol include Capa™ 2101, Capa™ 3031, Capa™ 3041 and Capa™ 4101, each of which are available from Perstop Group, Perstop, Sweden.

In some embodiments, the coating composition further includes a fluorinated alcohol. For example, the fluorinated alcohol can have one reactive functional group (e.g., a hydroxyl group). By having one reactive group, the fluorinated alcohol can be a migratory fluorinated compound capable of migrating to a surface of the coating composition during formation (e.g., reaction or curing) of the first topcoat. While the extent of the migration of the first fluorinated compound (e.g., the migratory fluorinated compound) is not fully known, based on the acid resistance of the first topcoat formed from the composition and the observed contact angle of water on the first topcoat, it is believed that at least some of the fluorinated alcohol (e.g., the migratory fluorinated compound) migrates to the surface of the coating composition (e.g., the surface of a first topcoat formed from the coating composition).

It is believed that the migration of the fluorinated alcohol to the surface of the coating composition (or the surface of the first topcoat) improves the surface hydrophobicity of the resultant first topcoat and enhances resistance of the first topcoat to acid rain and humidity. In some embodiments, the fluorinated alcohol has a relatively low molecular weight to improve migration of the fluorinated alcohol. For example, the fluorinated alcohol may have a weight average molecular weight in a range of about 300 g/mole to about 400 g/mole, such as a weight average molecular weight of about 364 g/mole. The fluorinated alcohol can include a perfluorinated carbon chain and a hydroxyl group. The fluorinated alcohol can also include a linking group between the perfluorinated carbon chain and the hydroxyl group. Non-limiting examples of the linking group include alkylene groups, such as ethylene, propylene and vinylene groups, and sulfonamide groups.

According to embodiments of the invention, a first topcoat formed from the coating composition can include the fluorinated alcohol at a surface of the first topcoat. By including the fluorinated alcohol at a surface of the first topcoat, the hydrophobicity and acid resistance of the surface of the first topcoat are increased, thereby increasing the corrosion resistance of the first topcoat. The presence of the fluorinated alcohol at a surface of the coating composition (or the first topcoat) also increases the corrosion resistance of a coated substrate including the coating composition, for example, as a first topcoat. The fluorinated alcohol may be included in the coating composition in an amount in a range of about 0.1 wt % to about 5 wt %, for example, 1 wt %, based on the total weight of the solids content of the coating composition.

In some embodiments, the fluorinated alcohol is a partially fluorinated compound including a hydroxyl group. For example, in certain portions of the compound, most or all of the hydrogen atoms can be replaced with fluorine atoms, while other portions of the compound can include hydrogen bonded to carbon. In other embodiments, the fluorinated alcohol is a perfluorinated compound including a perfluorinated carbon backbone and a hydroxyl group. As would be understood by those of ordinary skill in the art, a "perfluorinated" compound (or chain) is a compound (or chain) in which all hydrogen atoms bonded to carbon atoms are replaced with fluorine atoms. The fluorinated alcohol can have a carbon backbone having 1 to 20 carbon atoms.

Non-limiting examples of the fluorinated alcohol include perfluorinated or partially fluorinated aliphatic compounds. For example, commercially available perfluorinated aliphatic compounds and/or solutions of perfluorinated aliphatic compounds such as, for example, N-ethyl-N-(2-hydroxyethyl) perfluorooctylsulphonamide (e.g., FLUORAD™ FC-10; available from 3M Company, St. Paul, Minn.); and 3,3,4,4,5,5,6,6,7,7,8,8,8-tridecafluoro-1-octanol (e.g., CAPSTONE™ 62-AL), and perfluoroalkyl-1-ethanol (e.g., ZONYL® BA) (each available from E.I. du Pont de Nemours and Company, Wilmington, Del.) can be used. ZONYL® is a registered trademark of E.I. du Pont de Nemours and Company. Examples of the fluorinated alcohol include Structures 10 and 11 below

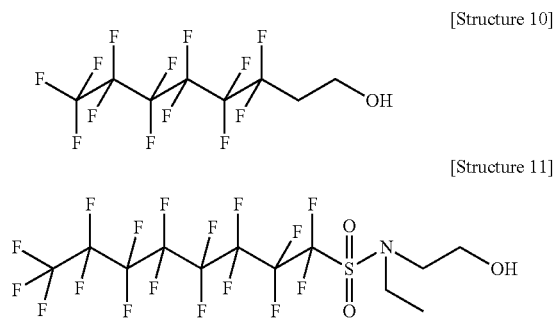

[Structure 10]

[Structure 11]

In some embodiments, the coating composition further includes a fluorinated polyol. The fluorinated polyol can be a compound having a carbon backbone with 1 to 20 carbon atoms, and two or more reactive groups, such as hydroxyl groups. That is, the fluorinated polyol can be multifunctional. For example, the fluorinated polyol can be bifunctional, such as a compound having two or more hydroxyl groups. As a result of having two or more reactive functional groups, the fluorinated polyol can react to form a three-dimensional network. In contrast to the fluorinated alcohol, the majority of the fluorinated polyol does not migrate to a surface of the coating composition (or a surface of a first topcoat formed from the composition) and instead is distributed across the thickness of the coating composition or coating (e.g., is distributed throughout the bulk material of the coating composition, or the bulk material of a first topcoat formed from the coating composition). The fluorinated polyol improves the bulk hydrophobicity of a first topcoat formed from the coating composition, thereby improving the acid rain resistance of the first topcoat. Existing coatings (e.g., topcoats), such as FX-446 (available from PPG Industries Inc.), provide some acid rain resistance, but first topcoats according to embodiments of the present invention including the fluorinated polyol (or a reacted fluorinated polyol) in the bulk of the first topcoat provide improved acid rain resistance compared to existing coatings.

Inclusion of the fluorinated polyol causes the coating composition to form a three-dimensional polymer network. Specifically, the two or more reactive functional groups (e.g., hydroxyl groups) of the fluorinated polyol each react with other polymer molecules to form the three-dimensional network structure. The rigidity of the three-dimensional polymer network formed with the fluorinated polyol affects the resiliency of a first topcoat formed from the coating composition. Similarly, other components of the coating composition, such as non-fluorinated polyols (e.g., the aliphatic polyester polyols), can also form part of the three-dimensional network and contribute to the resiliency of a first topcoat formed from the composition. As an example, the rigidity of the three-dimensional network of the composition is influenced, in part, by the number of reactive functional groups (e.g., hydroxyl groups) contained in the fluorinated polyol. Thus, the number of reactive functional groups of the fluorinated polyol will affect the resiliency of a first topcoat formed from the coating composition. Similarly, the number of reactive functional groups (e.g., hydroxyl groups) included in the non-fluorinated polyol (e.g., the polyester polyol) will also affect the resiliency of a first topcoat formed from the coating composition.

In general, greater crosslink density (which is directly related to the number of reactive functional groups (e.g., hydroxyl groups) included in each of the components of the composition) leads to greater rigidity, improved chemical and solvent resistance, and decreased abrasion resistance. The resiliency of a first topcoat formed from the coating composition is also influenced by the molecular weight, size and type of the backbone of the fluorinated and non-fluorinated compounds in the coating composition. When the composition includes compounds that have more rigid backbone structures, the composition will also be more rigid, while compounds that have relatively more flexible backbone structures will produce a composition that has relatively more resiliency. For a given polyol, increasing the molecular weight of the polyol generally results in a compound that forms coatings having greater resiliency, as compared to the corresponding lower molecular weight polyols.

Accordingly, the desired resiliency of the composition can be achieved by appropriately selecting the number of reactive functional groups (e.g., hydroxyl groups) and molecular weights of the fluorinated compounds or the non-fluorinated compounds. For example, a fluorinated polyol having a fluorinated carbon backbone and two reactive functional groups (e.g., two hydroxyl groups) will form a three-dimensional network that is more flexible than the three-dimensional network formed by a fluorinated polyol having similar chemical composition, the same (or substantially the same) molecular weight, and a fluorinated carbon backbone and three reactive groups (e.g., three hydroxyl groups). Similarly, a fluorinated polyol having three reactive functional groups (e.g., three hydroxyl groups) will form a three-dimensional network that is more flexible than the three-dimensional network formed by a fluorinated polyol having the same (or substantially the same) chemical structure, the same (or substantially the same) molecular weight, a fluorinated carbon backbone, but four reactive groups (e.g., four hydroxyl groups). Increasing the flexibility of the three-dimensional network resulting from use of a fluorinated polyol having two hydroxyl groups increases the resiliency of a first topcoat formed from the coating composition. Thus, in some embodiments, the coating composition (or first topcoat) includes a bifunctional fluorinated polyol (e.g., a compound having two hydroxyl groups), such coating compositions produce first topcoats having increased resiliency over coatings produced from coating compositions including trifunctional or tetrafunctional fluorinated polyols (e.g., compounds having three or four hydroxyl groups, respectively). The above-described principles are also applicable to other components of the coating composition, such as the non-fluorinated compounds. For example, desirable resiliency of the first topcoat can be achieved using an appropriate mixture of non-fluorinated difunctional and tetra-functional polyester polyols in the coating composition.

Non-limiting examples of the fluorinated polyol include fluoropolymers and fluoropolymer precursors, examples of which include, but are not limited to, commercially available pure resins and/or solutions of fluoropolymers and/or fluoropolymer precursors such as LUMIFLON® LF 600X, LUMIFLON® LF 9716, LUMIFLON® LF 9721, LUMIFLON®-910LM and LUMIFLON® LF 916F (available from AGC Chemicals Inc., Exton, Pa.); FLUOROLINK® D10-H, FLUOROLINK® E10-H, FLUOROLINK® D, FOMBLIN® ETX, FOMBLIN® MF-402 and FLUOROBASE Z-1030 (each available Solvay Solexis, Inc.); and POLYFOX® PF-656 and POLYFOX® PF-7002 (available from Omnova Solutions, Fairlawn, Ohio). LUMIFLON® is a registered trademark of Asahi Glass Co., Ltd., FLUOROLINK® is a registered trademark of Solvay Solexis, Inc, FOMBLIN® is a registered trademark of Solvay Fluorati Holding S.P.A., Corporation and POLYFOX® is a registered trademark of Ampac Fine Chemicals LLC.

Of the foregoing examples of the fluorinated polyol, LUMIFLON®-910LM, which is a fluoroethylene vinyl ether, exhibited the best compatibility with the other components of the coating composition. LUMIFLON®-910LM was compatible with the other components of the coating composition throughout a wide range of amounts. The alternating fluoroethylene and vinyl ether segments of LUMIFLON®-910LM provide the resultant first topcoat with good weatherability. For example, the fluoroethylene segments may enhance durability and hydrophobicity of the resultant first topcoat. Accordingly, in some embodiments, the fluorinated polyol includes a backbone including alternating substituted or unsubstituted fluoroethylene and substituted or unsubstituted vinyl ether segments. An example of the fluorinated polyol is shown as Structure 12 below, in which "FE" indicates a repeating fluoroethylene unit and "VE" indicates a repeating vinyl ether unit. In Structure 12, $R_1$ may provide transparency, gloss and hardness; $R_2$ may provide flexibility; $R_3$ may provide crosslinking ability; and $R_4$ may provide adhesion.

[Structure 12]

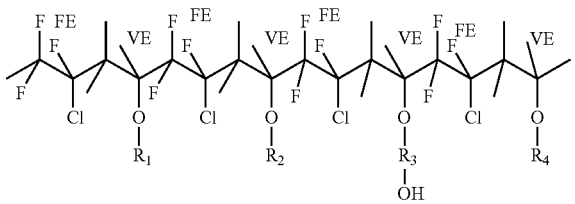

The fluorinated polyol can be included in the coating composition in an amount in a range of about 5 wt % to about 35 wt %, such as in a range of about 15 wt % to about 25 wt %, based on the total weight of the solids in the coating composition. In some embodiments, the fluorinated polyol is present in an amount of about 20 wt % based on the total weight of the solids in the coating composition. At 5 wt % and 10 wt % of the fluorinated polyol, there was some improvement in the acid resistance of the resultant first topcoat. At 15 wt % and 20 wt % of the fluorinated polyol, the resultant first topcoat exhibited substantially enhanced resistance to sulfuric acid and nitric acid (e.g., a 50:50 mixture of sulfuric acid and nitric acid) as compared to existing coatings, such as FX-446. The resultant first topcoat also exhibited improved surface tackiness and steam, humidity and QUV resistance as compared to existing coatings, such as FX-446. Unexpectedly, the fluorinated polyol did not noticeably reduce the anti-static properties of the first topcoat. However, the fluorinated polyol does reduce the Bayer abrasion resistance of the resultant first topcoat. For example, one example of the coating composition including 20 wt % of the fluorinated polyol (based on the total weight of the solids in the coating composition) formed a first topcoat that exhibited a change in haze of 3.5-4.0% after 600 strokes of the Bayer abrasion test (described in more detail above), while an example of the coating composition that did not include the fluorinated polyol exhibited a change in haze of about 1% after 600 strokes of the Bayer abrasion test.

The coating composition described herein can be formed by mixing (or blending) a Part A mixture (e.g., a base component) with a Part B mixture (e.g., a curing component). For example, the Part A mixture and the Part B mixture can be mixed together and cured to form a durable composition (or first topcoat) which is highly weatherable, abrasion resistant, acid resistant and resistant to chemicals or solvents. After mixing the Part A mixture and the Part B mixture, the resultant coating composition can be air dried for a time period in a range of 1.5 to 2 hours and then cured at about 200° F. for a time period of about 5 hours to form a first topcoat. For example, the coating composition (or first topcoat) can form a polyurethane first topcoat having anti-static properties.

The Part A mixture and Part B mixture may be mixed to achieve a ratio of reactive isocyanate groups to reactive hydroxyl groups (e.g., an NCO to OH ratio) in a range of 1.05 to 1.5, such as a ratio of about 1.3. An NCO to OH ratio of about 1.05 resulted in a first topcoat exhibiting good abrasion resistance, but compromised QUV resistance (e.g., poor test results after exposure to ultraviolet radiation at 158° F. (70° C.) followed by exposure to condensation for 4 hours at 122° F. (50° C.)). An NCO to OH ratio of about 1.3 resulted in a first topcoat exhibiting good abrasion resistance, good QUV resistance, and good resistance to rain erosion. An NCO to OH ratio of about 1.4 resulted in a first topcoat exhibiting good QUV resistance, but lower abrasion resistance and inferior resistance to rain erosion, as compared to the first topcoat formed from the coating composition having an NCO to OH ratio of about 1.3. An NCO to OH ratio of about 1.5 resulted in a coating composition having a short pot life, poor surface flow and poor cosmetics.

The Part A mixture can include, for example, any or all of the polyester polyol (e.g., the first and/or second polyester polyol), the fluorinated polyol, the hydrophilic polyol and the fluorinated alcohol. The Part A mixture can further include additives, such as, for example, a migratory ultraviolet light (UV) absorber, a reactive UV absorber including a hydroxyl group, a migratory UV stabilizer, a reactive UV stabilizer including a hydroxyl group, an antistatic agent (e.g., a conductive compound), an antioxidant, a catalyst, a flow control agent and/or a solvent. However, the Part A mixture need not contain each of these components. The Part A mixture can include additional additives as well.

A migratory UV absorber and/or a reactive UV absorber may be included in the coating composition to absorb UVA and UVB radiation incident to the resultant first topcoat. UV absorbers increase the resistance of the resultant first topcoat to yellowing and/or degradation, and improve long term outdoor durability of the first topcoat. The migratory UV absorber and reactive UV absorber can be based upon any suitable UV absorber. The migratory UV absorber does not include a reactive functional group (e.g., a hydroxyl group) and migrates to a surface of the coating composition (or first topcoat) during the formation (e.g., curing) of the coating composition (or first topcoat). By including the migratory UV absorber, the first topcoat includes a higher concentration of UV absorber at the surface of the composition than a first topcoat not including a migratory UV absorber. Having a higher concentration of UV absorber at the surface of the composition (or first topcoat) improves the lifetime of the first topcoat made from the composition. However, it is desirable to also have UV absorber in the bulk of the composition, as having UV absorbers both at the surface of the composition and in the bulk of the composition will extend the lifetime of a first topcoat made from the composition as compared to a coating made from a composition that only includes UV absorber at the surface.

Additionally, if the compounds migrate to a surface of the composition too quickly, the composition may form haze. For example, UV absorbers that do not include a hydroxyl group (e.g., a reactive hydroxyl group) may migrate to the surface of the first topcoat too quickly resulting in haze. Accordingly, in some embodiments, the coating composition includes the migratory UV absorber only in small amounts (e.g., in a range of about 0.5 wt % to about 0.75 wt % based on the total weight of the solids of the coating composition), if at all. Examples of migratory UV absorbers are shown as Structures 13-17 below.

[Structure 13]

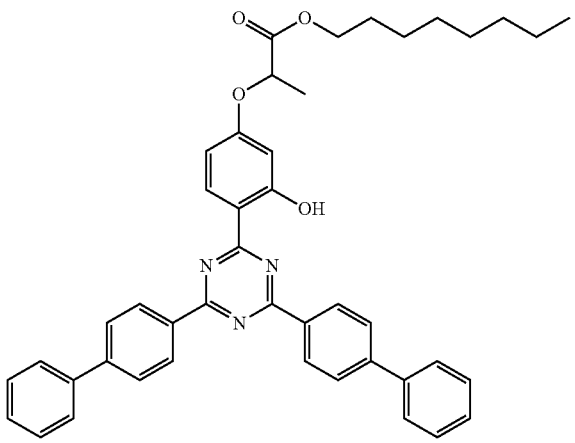

[Structure 14]

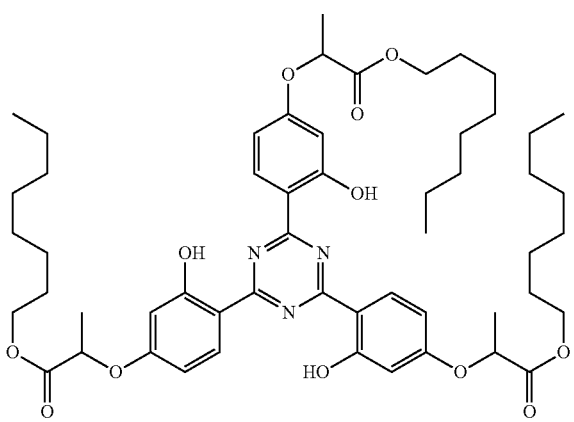

[Structure 15]

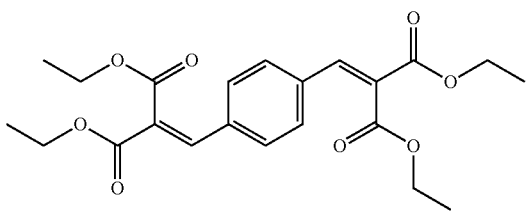

[Structure 16]

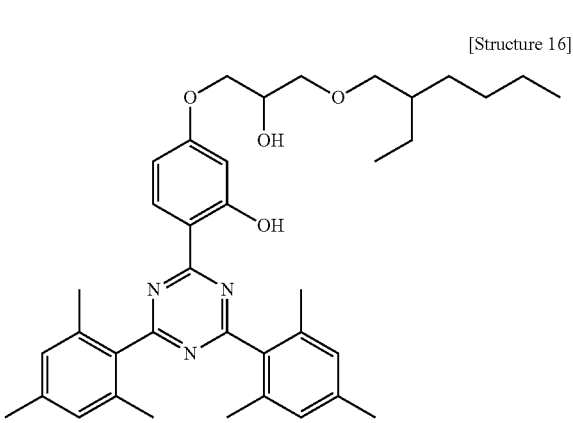

[Structure 17]

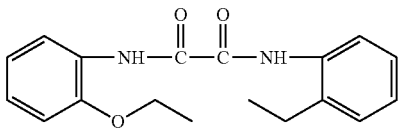

A coating composition according to embodiments of the present invention can include reactive UV absorber as well as, or instead of, the migratory UV absorber. The reactive UV absorber can include one or more reactive functional groups, such as a hydroxyl group. By including the reactive groups, a majority of the reactive UV absorber does not migrate to the surface of the coating composition or the resultant topcoat and instead is distributed across the thickness of the coating composition or resultant topcoat (e.g., is distributed throughout the bulk of the coating composition or the resultant topcoat). Additionally, if the reactive UV absorber is multifunctional, it may contribute to the three-dimensional polymer network formed on reaction of the components of the composition. A non-limiting example of the reactive UV absorber is shown as Structure 18 below, and an example of a commercially available mixture of a migratory UV absorber and a reactive UV absorber is shown as Structure 19 below.

[Structure 18]

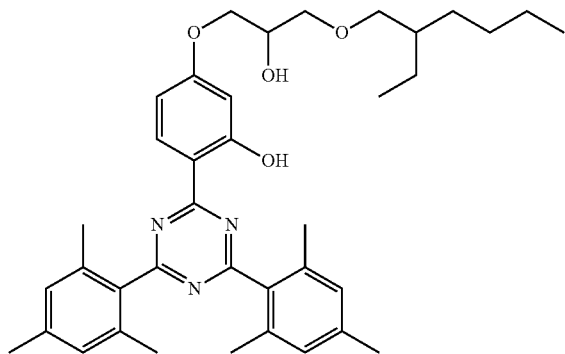

[Structure 19]

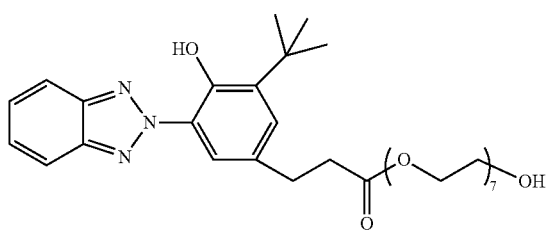

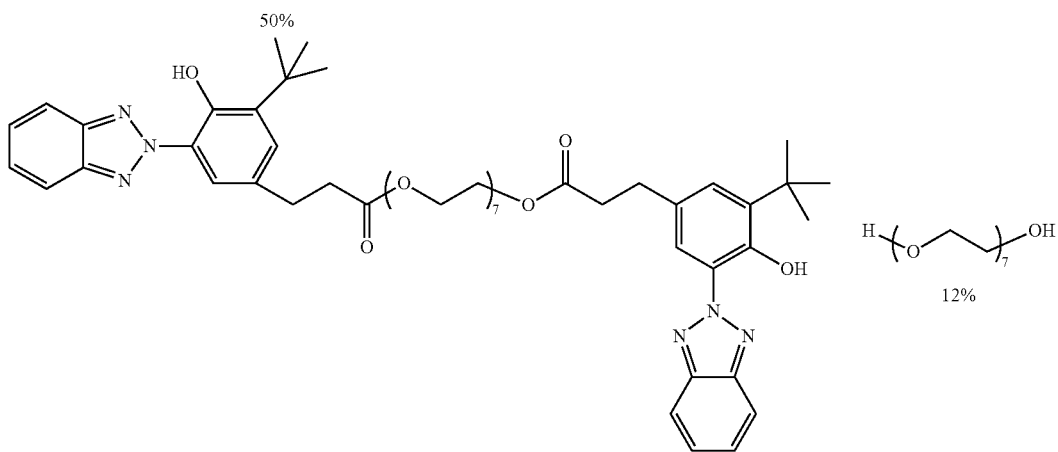

TINUVIN 1130

Non-limiting commercially available examples of the migratory UV absorber and reactive UV absorber include propanoic acid, 2-[4-[4,6-bis([1,1'-biphenyl]-4-yl)-1,3,5-triazin-2-yl]-3-hydroxyphenoxy]-,isooctyl ester (e.g., TINUVIN® 479), β-[3-(2-H-benzotriazole-2-yl)-4-hydroxy-5-t-butylphenyl]-propionic acid-poly(ethylene glycol) 300 ester, bis {β-[3-(2-H-benzotriazole-2-yl)-4-hydroxy-5-t-butylphenyl]-propionic acid}-poly(ethylene glycol) 300 ester (e.g., TINUVIN® 1130), TINUVIN® 477 and 2-[4-[(2-hydroxy-3-(2'-ethyl)hexyl)oxy]-2-hydroxyphenyl]-4,6-bis(2,4-dimethylphenyl)-1,3,5-triazine (e.g., TINUVIN® 405) (each available from BASF Resins); and p-phenylenebis(methylenemalonic acid)tetraethyl ester (e.g., HOSTAVIN® B-CAP), 2-ethyl,2'-ethoxy-oxalanilide (e.g., HOSTAVIN® VSU), and propanedioic acid, 2-[(4-methoxyphenyl)methylene]-,1,3-dimethylester (e.g., HOSTAVIN® PR-25) (each available from Clariant International Ltd.). TINUVIN® is a registered trademark of Ciba Specialty Chemical Corporation. HOSTAVIN® is a registered trademark of Hoechst GMBH Corporation.

Example first topcoats formed from coating compositions including the UV absorber according to Structure 18 exhibited no discernible sign of haze formation. It is believed that the presence of the hydroxyl group of the foregoing reactive UV absorbers prevented (or reduced) the migration of the UV absorbers to the surface of the first topcoat by reacting with isocyanate functional groups to form urethane linkages and becoming part of the three-dimensional network, thereby preventing (or reducing) the formation of haze. TINUVIN® 1130 includes both a reactive UV absorber and a migratory UV absorber and, therefore, may cause haze in the first topcoat when used in excess. The migratory UV absorber may be included in the coating composition in a small amount without causing haze in the resultant first topcoat. For example, the migratory UV absorber shown as Structure 13 can be included in the coating composition in an amount in a range of about 0.5 wt % to about 0.75 wt % based on the total weight of the solids of the coating composition without causing noticeable haze in the resultant first topcoat, while also enhancing the QUV resistance of the resultant first topcoat. It is believed that the migratory UV absorber shown as Structure 13 will be present at a higher concentration at the surface of the resultant first topcoat than in the bulk material of the first topcoat, thereby providing additional protection against UV light. Some UV absorbers, such as HOSTAVIN® B-CAP, exhibited poor solubility as a result of poor compatibility with the other components of the coating composition.

The migratory UV stabilizer and reactive UV stabilizer can be based upon any suitable UV stabilizer, such as any suitable free radical scavenger, that has been modified to be reactive or migratory. The migratory UV stabilizer and reactive UV stabilizer reduce degradation of the first topcoat by UV light by scavenging free radicals formed by the dissociation of chemical bonds as a result of UV light absorption. The migratory UV stabilizer does not include a reactive functional group (e.g., a hydroxyl group) and migrates to the surface of the first topcoat during the formation (e.g., curing) of the first topcoat. By including the migratory UV stabilizer, the first topcoat includes a higher concentration of the UV stabilizer at the surface of the first topcoat than does a coating not including a migratory UV stabilizer. Having a higher concentration of UV stabilizer at the surface of the first topcoat improves the lifetime of the first topcoat, and hence improves the lifetime of a first topcoat formed from the coating composition.

However, it is desirable to also have UV stabilizers in the bulk of the first topcoat, as having UV stabilizers both at the surface of the first topcoat and in the bulk of the first topcoat will extend the lifetime of the first topcoat as compared to a coating that only includes UV stabilizers at the surface. Additionally, if the compounds migrate to a surface of the first topcoat too quickly, the first topcoat may develop a haze. Accordingly, a composition according to embodiments of the present invention can include the reactive UV stabilizer, the migratory UV stabilizer or both. The reactive UV stabilizer can include one or more reactive functional groups, such as a hydroxyl group. By including the reactive groups, a majority of the reactive UV stabilizer does not migrate to a surface of the first topcoat and instead remains in the interior of the first topcoat (e.g., in the bulk material of the first topcoat) due to reaction of the reactive functional groups with other components of the coating composition. Additionally, if the reactive UV stabilizer is multifunctional, it may contribute to the formation of the three-dimensional network. Non-limiting commercially available examples of the UV stabilizer include propanedioic acid [(4-methoxyphenyl)-methylene]-bis(1,2,2,6,6-pentamethyl-4-piperidinyl)ester (e.g., HOSTAVIN® PR-31 available from Clariant International Ltd.), Sanduvor 3055 (available from Clariant International Ltd.) and commercially available hindered aminoether light stabilizers such as TINUVIN® 123, TINUVIN® 292, TINUVIN® 326, TINUVIN® 328, TINUVIN® 765, TINUVIN® 900, TINUVIN® 900 and TINUVIN® 152 (each available from BASF Resins). TINUVIN® is a registered trademark of Ciba Specialty Chemical Corporation. HOSTAVIN® is a registered trademark Hoechst GMBH Corporation. Examples of reactive UV stabilizers and migratory UV stabilizers are shown as Structures 20-29. Example first topcoats formed from examples of coating compositions including the UV stabilizer according to Structure 21 exhibited no discernible sign of haze formation.

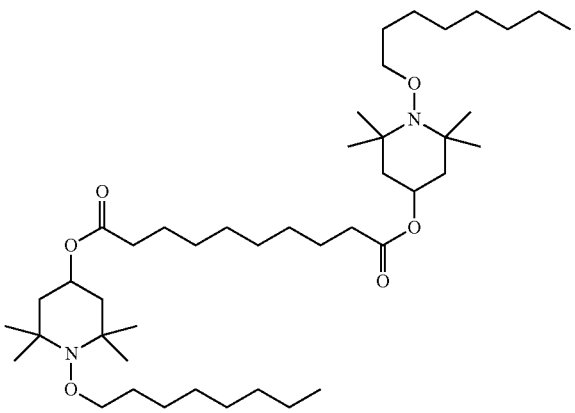

[Structure 20]

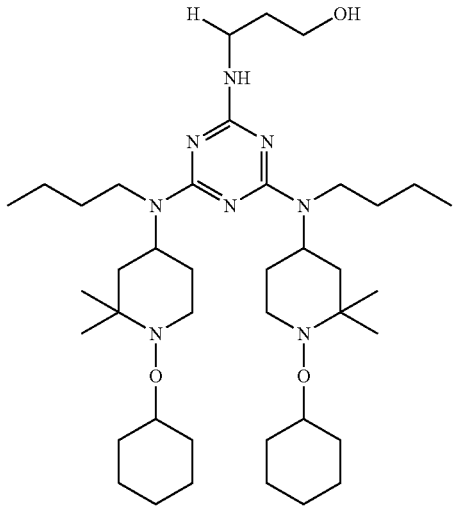

[Structure 21]

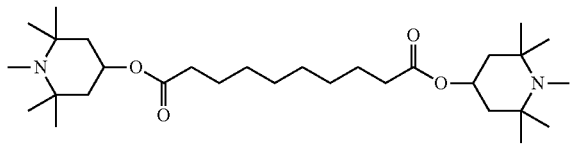

[Structure 22]

75%

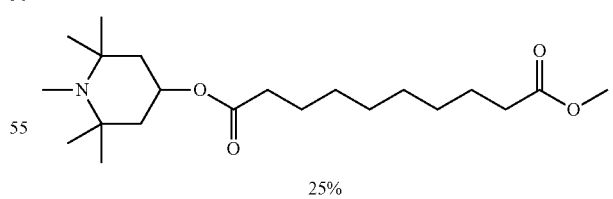

25%

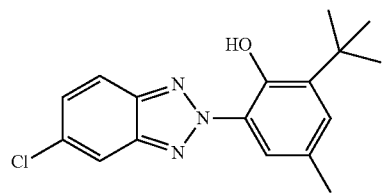

[Structure 23]

[Structure 24]

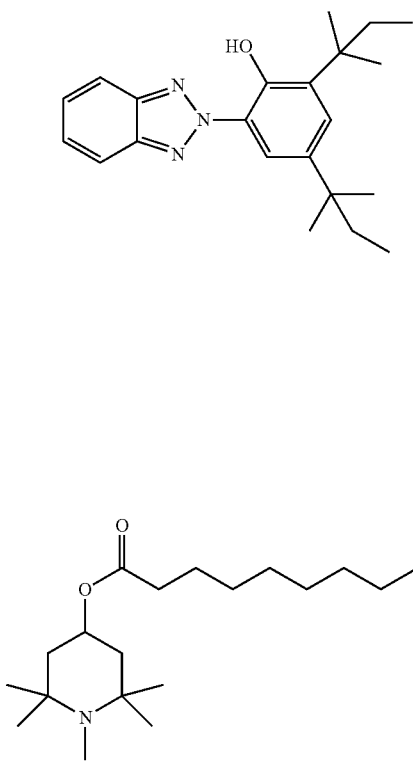

[Structure 25]

[Structure 26]

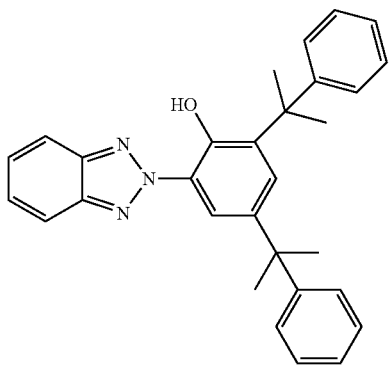

[Structure 27]

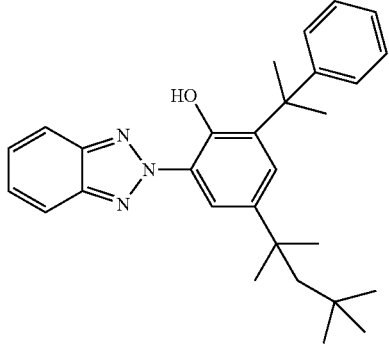

[Structure 28]

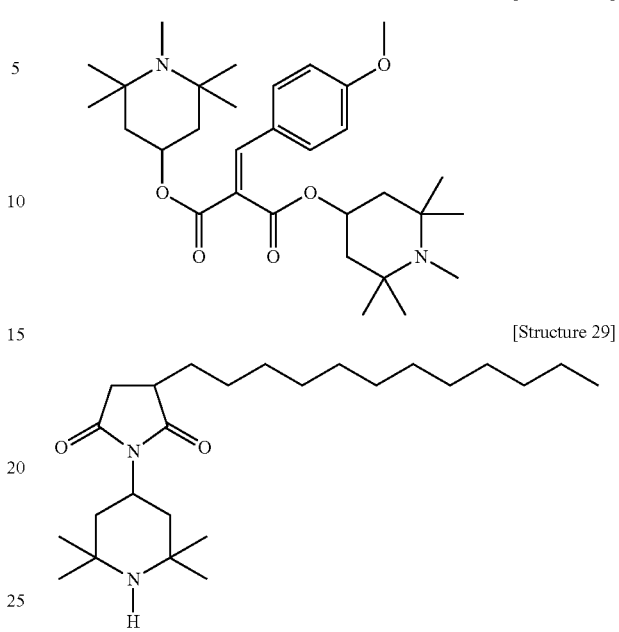

[Structure 29]

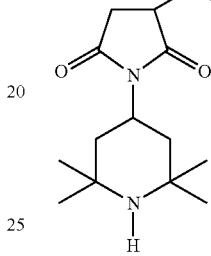

The Part A mixture can include anti-static agents (e.g., conductive compounds, such as conductive metal oxides, quaternary ammonium salts, inherently conductive polymers, and/or other suitable conductive agents), such as those described in U.S. Patent Application Publication No. 2010/0025533 and U.S. Patent Application Publication No. 2010/0028684, the entire contents of which are incorporated herein by reference. Non-limiting commercially available examples of the anti-static agents include Antistat SD 100 (available from E.I. du Pont de Nemours and Company), EA Antistat (available from Wells Plastics Ltd), and MAXOMER® AS-1018/75DC (available from PCC Chemax, Inc.). MAXOMER® is a registered trademark of PCC Chemax, Inc.

The anti-static agents (e.g., conductive compounds) can be used to reduce the electrical resistance (e.g., sheet resistance) of the resultant first topcoat to levels acceptable for P-static dissipation, which should be maintained even at low temperatures (e.g., −40° F.). The hydrophilic polyisocyanates discussed above can act as a conductive compound. Alternatively or additionally, a hydrophilic polyol may be included in the coating composition.

For example, the first topcoat described herein can have a sheet resistance such that electric charge (e.g., P-static) can pass through the first topcoat to another layer (e.g., an electrically conductive stack), which can then dissipate or drain the charge. If the resistance of the first topcoat is too high, the amount of electric charge that can pass through the first topcoat is reduced, and the conductive layer will not provide acceptable levels of P-static dissipation. In some embodiments, a primer layer (e.g., a polyacrylate primer) may be included between the first topcoat and the conductive layer (e.g., the electrically conductive stack). Although the primer layer may have a high sheet resistance (e.g., higher than that of the coating), charge may still pass through the first topcoat and the primer layer to the conductive layer if the primer layer is sufficiently thin. Thus, if a primer layer is included it may be made sufficiently thin to allow enough electric charge to pass through the first topcoat and the primer layer to the conductive layer to provide P-static dissipation.

The general electrical resistance of the polyurethane topcoats are more than or equal to $10^{12}\Omega/\square$ to independently dissipate the static charge. The sheet resistance of the first topcoat described herein varies depending upon the sheet resistance of the material on which the first topcoat is formed. For example, if the first topcoat is on a dielectric layer (e.g., polycarbonate), the sheet resistance of the first topcoat may be about $10^9$ ohms per square, even if a thin primer layer is included between the first topcoat and the dielectric layer. If the first topcoat is on a conductive layer (e.g., a titanium oxide/Au/titanium oxide stack), the sheet resistance of the first topcoat may be $10^7$ ohms per square.

Hydrophilic polyisocyanates, such as those described above, improve conductivity in the first topcoats. Additionally, as described above, hydrophobic polyisocyanates provide first topcoats with durability. Thus, as described above, through the combination of hydrophobic and hydrophilic polyisocyanates (e.g., hydrophobic/hydrophilic HDI and IPDI based polyisocyanates), a first topcoat having a good balance of hardness, resiliency, surface tackiness, and conductivity can be obtained.

According to some embodiments, the coating composition may further include a hydrophilic polyol (e.g., a reactive anti-static resin), such as a hydrophilic polyol having a functionality of more than 2. The p-static properties of a first topcoat can be significantly improved by introduction of the hydrophilic polyol. The hydrophilic polyol can be any suitable hydrophilic polymer having salt moieties and pendant reactive hydroxyl groups. One non-limiting example of a suitable hydrophilic polyol is Superstat 463, which is commercially available from Advanced Materials & Coating Specialties, Azusa, Calif. The hydrophilic polyol reacts with the polyisocyanates and becomes part of the three dimensional network. A clear first topcoat is then formed with no discernible sign of migration of the hydrophilic polyol to the surface of the first topcoat. It is believed that the conductivity is achieved by moisture absorption in the first topcoat, but the hydrophilic polyol appears to have some inherent conductivity.

A first topcoat having an electrical resistance of $10^5\Omega/\square$ (on polycarbonate) and good optics is formed when the combined amount of the polyester polyol and the hydrophilic polyol includes 50 wt % of Superstat 463. Such a first topcoat has good performance in p-static tests, even at $-40°$ F. The hydrophilic polyol (e.g., Superstat 463) may be included in the coating composition in an amount in a range of about 5 wt % to about 30 wt % based on the total weight of the solids of the coating composition. When the hydrophilic polyol (e.g., Superstat 463) is included in the coating composition in an amount that is outside of the foregoing range (e.g., is higher than 30 wt %), the resultant coating may have high surface tackiness and may be susceptible to moisture attack when exposed to humidity. The surface tackiness can be reduced by the addition of BYK 3700 (a polydimethylsiloxane resin with pendant hydroxyl groups), incorporation of ethylene glycol or trimethylol propane (TMP), and/or partial replacement of N-75 with IPDI trimer. None of these improvements in surface tackiness yielded a first topcoat having good weatherability, but some of the coatings did exhibit good abrasion resistance.

Useful anti-static first topcoats were formulated by reducing the hydrophilic polyol (e.g., Superstat 463) content down to a range of 14 wt % to 26 wt % (depending upon the other components of the coating composition). A typical two-part polyurethane coating has a resistance of more than $10^{12}$ ohms/sq. and is dielectric. By addition of 24 wt % Superstat 463, the resistance is reduced to between the range of $10^8$ to $10^9$ ohms/sq. on polycarbonate and $10^7$ to $10^8$ ohms/sq. on a conductive layer, such as a stack including titanium oxide/Au/titanium oxide, a stack including AZO/Au/AZO, an ITO layer, a Au layer, an Al layer, and the like. It has repeatedly been demonstrated, by the results of specification tests, that a combination of conductive layer/primer/topcoat can readily dissipate p-static charge even at temperatures as low as $-40°$ F.

Superstat 463 can enhance the conductivity of the first topcoat. Superstat 463 is compatible with all components of the coating composition and gives a first topcoat with high transparency, low haze, good surface flow, and superior cosmetics. Interestingly, without the presence of Superstat 463, the coating composition may exhibit poor film-forming properties. Therefore, Superstat may be beneficial in enhancing the compatibility among the hydrophilic/hydrophobic components of the coating composition.

The Part A mixture can further include a catalyst, a flow control agent and solvents as is known in the art. Selection of a suitable catalyst, flow control agent and solvent is within the skill of those of ordinary skill in the art and, therefore, further discussion of those components will be omitted.

The Part B mixture (e.g., curing component) can include the isocyanate as described above. The curing component can further include cure accelerators, cure retardants, plasticizers, additives, and/or fillers. However, like the Part A mixture, the Part B mixture need not contain each of these components. The Part B can include additional additives as well. Selection of suitable cure accelerators, cure retardants, plasticizers, additives, and fillers is within the skill of those of ordinary skill in the art and, therefore, further discussion of those components will be omitted.

According to embodiments of the present invention, the coating composition includes at least one solvent. The solvent(s) may be added to the Part A mixture, the Part B mixture, or both the Part A mixture and the Part B mixture. The solvent(s) reduce the viscosity of the coating composition to make it flow-coatable. The integrity and appearance of the resultant first topcoat can be affected by the nature of the solvents used, even though the solvents are not a permanent component of the cured first topcoat. The evaporation rate of the solvent (or solvent mixture) can be adjusted so that evaporation takes place quickly during the initial drying (e.g., after flow coating) to prevent excessive flow, but slowly enough to give sufficient leveling and adhesion. The solvent(s) used can be non-reactive with isocyanates and non-aggressive against the substrate and/or coated surfaces, so that no (or little) attack takes place during the flow coating and/or airdrying process. The solvent(s) could also influence the rate of isocyanate-hydroxyl reactions, for example during the airdrying period, depending on the extent of hydrogen bonding and dipole moment character of the solvent.

Non-limiting examples of the solvent include isobutyl acetate, 2,6-dimethyl-4-heptanol, butoxy ethyl acetate, isobutyl acetate, 2-butoxyethyl acetate, diisobutyl ketone, dipropyleneglycol dimethyl ether, and propyleneglycol dimethyl ether. In some embodiments, the solvent includes diacetone alcohol (DAA). DAA has a slow evaporation rate and good flow properties. DAA effectively dissolves all (or most) of the components of the coating composition to give a clear, homogeneous solution. DAA has a tertiary hydroxyl group, but the reactivity of the tertiary hydroxyl with isocyanate is much lower than the hydroxyls of the other components of the coating composition, and since DAA begins to evaporate during the airdrying period, the reaction of DAA with the polyisocyanates is negligible.

The solvent may also be used to adjust the solids content of the coating composition. It may be beneficial to maximize the thickness of the resultant first topcoat for improved performance in the rain erosion test. At 70% solids content the coating composition is too viscous for successful flow coating application with existing equipment. At a solids content of 65%, the coating composition forms a first topcoat that is free from cosmetic defects, has good surface quality, and provides good performance in the rain erosion test. A coating composition having a 65% solids content applied to a production F-22 test canopy by a two component mixer (e.g., a mixer, such as the DL 2 mixer, available from Liquid Control Ltd., Wellingborough, England) formed a coating having good surface quality. Offcuts from the test canopy had no apparent damage after 44 minutes of rain erosion testing at 550 mph.

Figure 5:
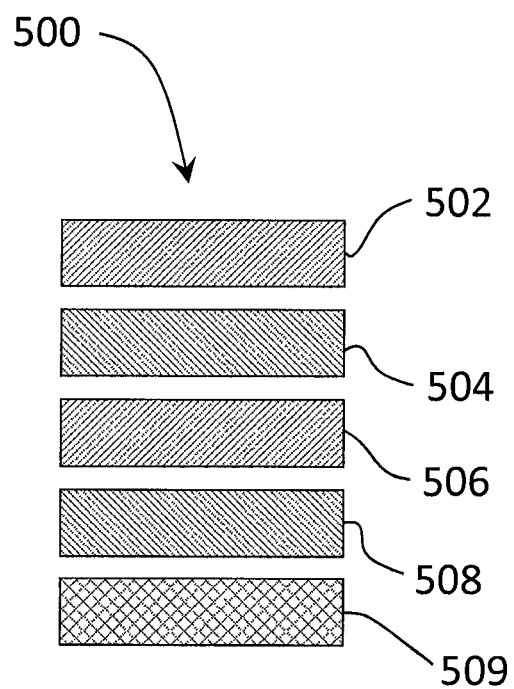
FIG. 5 is an exploded, cross-sectional view of another embodiment of a multi-layer stack.

FIG. 5 shows another embodiment of a multi-layer stack 500. The multi-layer stack includes a substrate 502, a drain layer 504, a dielectric layer 506, and a heater layer 508, each of which is the same or substantially the same as the corresponding layers described above and, therefore, further description thereof will be omitted here. The multi-layer stack further includes a second topcoat 509 on the heater layer. The second topcoat can be any suitable protective coating. For example, the second topcoat can include a diamond like carbon, a polyurethane, a polyacrylate, a polysiloxane, an epoxy, a silicon oxide, a titanium oxide, an aluminum oxide, a material deposited by plasma enhanced chemical vapor deposition (e.g., silicon oxycarbide), zirconium oxynitride, cerium oxide, or a combination thereof. The second topcoat can protect the heater layer. The materials of the second topcoat may be the same or substantially the same as those described above with respect to the first topcoat and, therefore, further description thereof will be omitted here. In a non-limiting example, the second topcoat can include a polyacrylate coating having a thickness in a range of 1 to 10 μm applied by flow coating in a humidity and temperature controlled clean room. The wet coating can be air dried for a time period in a range of 1 to 2 hours. The air dried coating can then be UV cured at an energy of 6 Joules using multiple passes.

Figure 6:
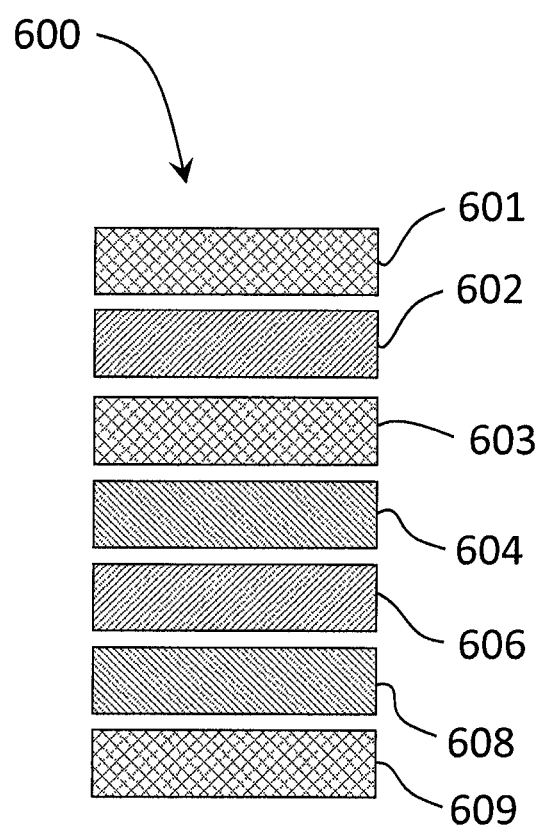
FIG. 6 is an exploded, cross-sectional view of another embodiment of a multi-layer stack.

FIG. 6 shows another embodiment including a multi-layer stack 600. The multi-layer stack includes a first topcoat 601, a substrate 602, a base layer 603, a drain layer 604, a dielectric layer 606, a heater layer 608, and a second topcoat 609, each of which is the same or substantially the same as the corresponding layers described above and, therefore, further description thereof will be omitted here.

EXAMPLE

A multi-layer stack was prepared including a polycarbonate substrate, a heater layer including ITO prepared according to the above description, and a drain layer including a laminated film including inkjet printed electrically conductive lines as a conductive mesh prepared according to the above description. The multi-layer stack was then tested for induced electric charge at the heater layer using an electrostatic diagnostic test set available from Dayton-Granger, Fort Lauderdale, Fla. A probe of the electrostatic diagnostic test set was used to apply a voltage to the substrate and the induced voltage at the heater layer and at the drain layer was measured. Table 1 shows the data collected when both the ITO heater layer and the drain layer (i.e., the laminated film including inkjet printed electrically conductive lines) were not grounded. As can be seen in Table 1, when neither the heater layer nor the drain layer was grounded, a substantial voltage was induced at the heater layer.

TABLE 1

| Applied Voltage (kV) | Induced Voltage (kV) at Heater Layer | Induced Voltage (kV) at Drain Layer |
| --- | --- | --- |
| 0 | 0 | 0 |
| 10 | 0.88 | 1 |
| 20 | 7.49 | 8.30 |

Table 1 shows the data collected when both the ITO heater layer and the drain layer (i.e., the laminated film including inkjet printed electrically conductive lines) were not grounded. As can be seen in Table 1, when neither the heater layer nor the drain layer was grounded, a substantial voltage was induced at the heater layer.

TABLE 2

| Applied Voltage (kV) | Induced Voltage (kV) at Heater Layer | Induced Voltage (kV) at Drain Layer |
| --- | --- | --- |
| 0 | 0 | 0 |
| 10 | 0 | 0 |
| 20 | 0 | 0 |

Table 2 shows the data collected when the ITO heater layer, but not the drain layer (i.e., the laminated film including inkjet printed electrically conductive lines), was grounded. As can be seen in Table 2, when the heater layer was grounded, no voltage was induced at the heater layer or the drain layer. However, the heater layer is unable to substantially heat the substrate in this configuration.

TABLE 3

| Applied Voltage (kV) | Induced Voltage (kV) at Heater Layer | Induced Voltage (kV) at Drain Layer |
| --- | --- | --- |
| 0 | 0 | 0 |
| 10 | 0 | 0 |
| 20 | 0 | 0 |

Table 3 shows the data collected when the drain layer (i.e., the laminated film including inkjet printed electrically conductive lines), but not the ITO heater layer, was grounded. As can be seen in Table 3, when the drain layer was grounded, no voltage was induced at the heater layer or the drain layer.

While the present invention has been described in connection with certain exemplary embodiments, it is to be understood that the invention is not limited to the disclosed embodiments, but, on the contrary, is intended to cover modifications and equivalent arrangements included within the spirit and scope of the appended claims, and equivalents thereof. Throughout the text and claims, use of the word "about" reflects the penumbra of variation associated with measurement, significant figures, and interchangeability, all as understood by a person having ordinary skill in the art to which this application pertains. Additionally, throughout this disclosure and the accompanying claims, it is understood that even those ranges that may not use the term "about" to describe. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C.

§112, paragraph 6 for any limitations of any of the claims herein, except for those in which the claim expressly uses the words "means for" together with an associated function.

What is claimed is:

1. A multi-layer stack comprising:
   a transparent substrate;
   a drain layer on a first side of the substrate, the drain layer having a sheet resistance of less than about $10^6$ ohms per square;
   a heater layer on the drain layer, the drain layer being between the heater layer and the substrate;
   a dielectric layer between the heater layer and the drain layer;
   a first topcoat on a second side of the substrate opposite to the first side; and
   a second topcoat on the heater layer, the second topcoat comprising a material selected from the group consisting of diamond like carbons polyurethanes polyacrylates polysiloxanes epoxies, silicon oxides, aluminum oxides, silicon oxycarbides, zirconium oxynitrides, cerium oxides, and combinations thereof.

2. The multi-layer stack of claim 1, wherein the dielectric layer is configured to electrically insulate the heater layer from the drain layer such that the heater layer is capable of converting electric current applied to the heater layer to heat for melting ice or dissipating condensed moisture formed on the multi-layer stack.

3. The multi-layer stack of claim 1, wherein the dielectric layer has a dielectric constant of at least about 2.

4. The multi-layer stack of claim 1, wherein the drain layer has a sheet resistance of less than about 2,000 ohms per square.

5. The multi-layer stack of claim 4, wherein the drain layer has a sheet resistance of less than about 500 ohms per square.

6. The multi-layer stack of claim 1, wherein the transparent substrate comprises a material selected from the group consisting of glasses, polyacrylates, polycarbonates, polyurethanes and combinations thereof.

7. The multi-layer stack of claim 1, wherein the drain layer comprises a layer selected from the group consisting of transparent conductive oxide layers, transparent conductive metal layers, conductive meshes and combinations thereof.

8. The multi-layer stack of claim 7, wherein the transparent oxide layer comprises a transparent oxide selected from the group consisting of indium tin oxide, aluminum-doped zinc oxide, tin oxide, antimony-doped tin oxide, and combinations thereof, a metal of the transparent conductive metal layer is selected from the group consisting of gold, silver, palladium, platinum, and combinations thereof, and the conductive mesh is selected from the group consisting of inkjet printed electrically conductive lines, lithographically patterned electrically conductive lines, and combinations thereof.

9. The multi-layer stack of claim 1, wherein the dielectric layer comprises an organic layer, an inorganic layer, or a combination thereof.

10. The multi-layer stack of claim 9, wherein the organic layer comprises a material selected from the group consisting of polysiloxanes, polyacrylates, polyurethanes, epoxies, and combinations thereof.

11. The multi-layer stack of claim 9, wherein the inorganic layer comprises a material selected from the group consisting of diamond like carbon, silicon oxides, titanium oxides, aluminum oxides, silicon oxycarbides, zirconium oxynitrides, and combinations thereof.

12. The multi-layer stack of claim 1, wherein the heater layer has a sheet resistance in a range of 0.02 to 100 ohms per square.

13. The multi-layer stack of claim 1, wherein the first topcoat comprises a material selected from the group consisting of diamond like carbons, polyurethanes, polyacrylates, polysiloxanes, epoxies, silicon oxides, titanium oxides, aluminum oxides, silicon oxycarbides, zirconium oxynitrides, cerium oxides, and combinations thereof.

14. The multi-layer stack of claim 1, further comprising a base layer between the substrate and the drain layer, the base layer comprising a material selected from the group consisting of polysiloxanes, polyacrylates, epoxies, polyurethanes, and combinations thereof.

15. The multi-layer stack of claim 1, further comprising:
   drain leads coupled to the drain layer to ground the drain layer, and
   heater leads coupled to the heater layer to supply electric current to the heater layer.

16. The multi-layer stack of claim 1, further comprising a base layer between the substrate and the drain layer.

17. A transparency for a flying vehicle, comprising a multi-layer stack comprising:
   a substrate;
   a drain layer on a first side of the substrate, the drain layer having a sheet resistance of less than about $10^6$ ohms per square;
   a heater layer on the drain layer;
   a dielectric layer between the heater layer and the drain layer; and
   a second topcoat on the heater layer, the second topcoat comprising a material selected from the group consisting of diamond like carbons, polyurethanes, polyacrylates, polysiloxanes, epoxies, silicon oxides, aluminum oxides, silicon oxycarbides, zirconium oxynitrides, cerium oxides, and combinations thereof,
   wherein the drain layer is configured to be grounded to the flying vehicle, and
   wherein the multi-layer stack is configured to have the first side of the substrate face toward an interior of the flying vehicle.

18. The transparency of claim 17, wherein the substrate has a second side opposite to the first side, the second side being configured to face toward an exterior of the flying vehicle.

19. The transparency of claim 17, wherein the substrate has a second side opposite to the first side, and the drain layer is configured to be grounded to the flying vehicle to dissipate a charge induced at a second side of the substrate and to reduce an amount of charge induced at the heater layer.

20. A flying vehicle comprising the transparency of claim 17.

* * * * *